(12) United States Patent
Xiao et al.

(10) Patent No.: US 10,433,290 B2
(45) Date of Patent: Oct. 1, 2019

(54) UPLINK CONTROL INFORMATION TRANSMISSION METHOD AND APPARATUS IN CARRIER AGGREGATION

(71) Applicant: Huawei Technologies Co., Ltd., Shenzhen (CN)

(72) Inventors: Jiehua Xiao, Shanghai (CN); Yongxia Lyu, Ottawa (CA); Lei Guan, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/927,787

(22) Filed: Mar. 21, 2018

(65) Prior Publication Data

US 2018/0213524 A1 Jul. 26, 2018

Related U.S. Application Data

(63) Continuation of application No. PCT/CN2015/090314, filed on Sep. 22, 2015.

(51) Int. Cl.
*H04W 72/04* (2009.01)
*H04W 72/12* (2009.01)
(Continued)

(52) U.S. Cl.
CPC ....... *H04W 72/0413* (2013.01); *H04L 1/1812* (2013.01); *H04L 1/1864* (2013.01);
(Continued)

(58) Field of Classification Search
CPC . H04W 72/0413; H04W 52/34; H04W 72/12; H04L 1/1812; H04L 5/0055
See application file for complete search history.

(56) References Cited

U.S. PATENT DOCUMENTS

2010/0272048 A1* 10/2010 Pan ........................ H04L 1/1635
370/329
2011/0103286 A1* 5/2011 Montojo ............... H04W 48/08
370/312
(Continued)

FOREIGN PATENT DOCUMENTS

CN 101925113 A 12/2010
CN 102769507 A 11/2012
(Continued)

OTHER PUBLICATIONS

"PUCCH resource allocation," 3GPP TSG RAN WG1 Meeting #82, Beijing, China, R1-154335, pp. 1-4, 3rd Generation Partnership Project, Valbonne, France (Aug. 24-28, 2015).
(Continued)

*Primary Examiner* — Rina C Pancholi
(74) *Attorney, Agent, or Firm* — Leydig, Voit & Mayer, Ltd.

(57) ABSTRACT

Embodiments of the present disclosure provide a method for a transmission of uplink control information (UCI), such as hybrid automatic repeat request (HARQ) information. A base station sends first indication information to a user equipment (UE), to instruct the UE to dynamically determine the UCI according to the first indication information, and the base station allocates a physical uplink control channel (PUCCH) resource to the UE to transmit the UCI. The embodiments of the present disclosure may be used to implement a feedback of the UCI information in a carrier aggregation scenario, thereby improving performance of transmitting valid UCI information.

20 Claims, 11 Drawing Sheets

(51) Int. Cl.
*H04L 1/18* (2006.01)
*H04L 5/00* (2006.01)
*H04W 52/34* (2009.01)

(52) U.S. Cl.
CPC .......... *H04L 5/0055* (2013.01); *H04W 52/34* (2013.01); *H04W 72/04* (2013.01); *H04W 72/12* (2013.01)

(56) References Cited

U.S. PATENT DOCUMENTS

| | | | |
|---|---|---|---|
| 2012/0033648 A1* | 2/2012 | Papasakellariou | H04L 1/003 370/336 |
| 2012/0281645 A1* | 11/2012 | Li | H04L 1/0073 370/329 |
| 2012/0320823 A1 | 12/2012 | Ohta et al. | |
| 2013/0114474 A1* | 5/2013 | Fu | H04L 5/0055 370/280 |
| 2013/0121299 A1* | 5/2013 | Kim | H04L 5/001 370/329 |
| 2013/0195065 A1* | 8/2013 | Park | H04L 1/1861 370/329 |
| 2013/0230033 A1 | 9/2013 | Lee et al. | |
| 2013/0258978 A1* | 10/2013 | Aiba | H03M 13/136 370/329 |
| 2013/0279480 A1* | 10/2013 | Park | H04L 1/1861 370/335 |
| 2014/0050148 A1* | 2/2014 | Choi | H04L 1/1819 370/328 |
| 2014/0362792 A1* | 12/2014 | Cheng | H04L 1/0029 370/329 |
| 2015/0124670 A1* | 5/2015 | Park | H04L 1/1671 370/281 |
| 2015/0304915 A1 | 10/2015 | Uchino et al. | |
| 2015/0341156 A1* | 11/2015 | Yang | H04W 52/146 370/280 |
| 2016/0156447 A1 | 6/2016 | Kim et al. | |
| 2017/0126368 A1 | 5/2017 | Aiba et al. | |
| 2018/0084454 A1 | 3/2018 | Takeda et al. | |
| 2018/0263031 A1 | 9/2018 | Cheng et al. | |

FOREIGN PATENT DOCUMENTS

| | | |
|---|---|---|
| CN | 103098400 A | 5/2013 |
| CN | 103209483 A | 7/2013 |
| CN | 103580827 A | 2/2014 |
| CN | 103684714 A | 3/2014 |
| CN | 104579591 A | 4/2015 |
| CN | 104811281 A | 7/2015 |
| EP | 2639984 A2 | 9/2013 |
| EP | 3242433 A1 | 11/2017 |
| JP | 2013128202 A | 6/2013 |
| JP | 2014501079 A | 1/2014 |
| RU | 2560937 C1 | 8/2015 |
| WO | 2011137408 A2 | 11/2011 |
| WO | 2012093876 A2 | 7/2012 |
| WO | 2013104330 A1 | 7/2013 |
| WO | 2014084111 A1 | 6/2014 |
| WO | 2014107052 A1 | 7/2014 |
| WO | 2016158536 A1 | 10/2016 |

OTHER PUBLICATIONS

"PUCCH resource allocation," 3GPP TSG RAN WG1 Meeting 81, Fukuoka, Japan, R1-153196, pp. 1-5, 3rd Generation Partnership Project, Valbonne, France (May 25-29, 2015).

"PUCCH resource allocation," 3GPP TSG RAN WG1 Meeting 80bis, Belgrade, Serbia, R1-151849, pp. 1-3, 3rd Generation Partnership Project, Valbonne, France (Apr. 20-24, 2015).

"3rd Generation Partnership Project; Technical Specification Group Radio Access Network; Evolved Universal Terrestrial Radio Access (E-UTRA); Physical layer procedures(Release 12)," 3GPP TS 36.213 V12.6.0, pp. 1-241, 3rd Generation Partnership Project, Valbonne, France (Jun. 2015).

"3rd Generation Partnership Project; Technical Specification Group Radio Access Network; Evolved Universal Terrestrial Radio Access (E-UTRA); Radio Resource Control (RRC); Protocol specification(Release 12)," 3GPP TS 36.331 V12.6.0, pp. 1-449, 3rd Generation Partnership Project, Valbonne, France (Jun. 2015).

"HARQ-ACK transmission for supporting CA of up to 32 carriers," 3GPP TSG RAN WG1 Meeting #80, R1-150209, pp. 1-5, 3rd Generation Partnership Project—Valbonne, France (Feb. 9-13, 2015).

* cited by examiner

UPLINK CONTROL INFORMATION TRANSMISSION METHOD AND APPARATUS IN CARRIER AGGREGATION

CROSS-REFERENCE TO RELATED APPLICATIONS

This application is a continuation of International Application No. PCT/CN2015/090314, filed on Sep. 22, 2015, the disclosure of which is hereby incorporated by reference in its entirety.

TECHNICAL FIELD

Embodiments of the present disclosure relate to the communications technologies, and in particular, to an uplink control information transmission method and apparatus in carrier aggregation.

BACKGROUND

In a Long Term Evolution (LTE) system, a user equipment (UE) sends uplink control information (UCI) to a base station by using a physical uplink control channel (PUCCH). The UCI includes a scheduling request indicator (SR), hybrid automatic repeat request acknowledgement/negative acknowledgement (HARQ-ACK/NACK) information, that is, HARQ feedback information, and channel state information (CSI). The SR is used by the UE to apply to the base station for uplink scheduling. A downlink HARQ-ACK/NACK is used to indicate a decoding result of downlink-transmitted data and perform HARQ acknowledgement on downlink data sent on a PDSCH. The CSI is used to feed back information related to downlink channel quality, to help the eNodeB perform downlink scheduling.

In a Long Term Evolution Advanced (LTE-A) system, to support higher transmission bandwidth, a carrier aggregation (CA) technology is provided. CA means aggregating two or more component carriers (CC) to support higher transmission bandwidth. In a downlink CA scenario, a base station sends downlink data to a same UE on a plurality of CCs. Correspondingly, the UE needs to support feeding back of HARQ-ACK/NACK information on the plurality of downlink CCs.

A hybrid automatic repeat request (HARQ) is a technology combining a forward error correction (FEC) method and an automatic repeat request (ARQ) method. For an error that cannot be corrected by means of FEC, a receive end requests, by using an ARQ mechanism, a transmit end to retransmit data. The receive end usually uses a CRC check code to detect whether an error occurs on a received data packet. If no error occurs on the received data packet, the receive end sends an acknowledgement (ACK) to the transmit end. If an error occurs on the received data packet, the receive end discards the data packet and sends a negative acknowledgement (NACK) to the transmit end, and the transmit end retransmits the same data after receiving the NACK.

In existing CA that has been standardized, aggregation of a maximum of only five carriers is supported, and in a protocol, HARQ-ACK/NACK information is determined by using a semi-static method. In the semi-static method, when a quantity of configured carriers is less than or equal to 5, a codebook of the HARQ-ACK/NACK information is determined according to the quantity of configured carriers and a transmission mode (TM) and a carrier number of each configured carrier. In this method, when there is a configured carrier that is not scheduled (that is, not actually used for data transmission), or when a quantity of codewords transmitted on a carrier does not reach a maximum configuration, the HARQ-ACK/NACK information is padded with some useless bits.

To greatly increase a quantity of carriers that can be aggregated, the 3rd Generation Partnership Project (3GPP) provides LTE Carrier Aggregation Enhancement Beyond 5 Carriers (eCA). The eCA requires that a maximum of 32 carriers are aggregated and that CSI information of a plurality of carriers can be fed back in one subframe. Therefore, UCI information fed back by using a PUCCH is greatly increased. If HARQ-ACK/NACK information is determined according to the method in the existing protocol, more bits need to be fed back. Consequently, data transmission load is increased, performance of transmitting valid HARQ-ACK/NACK information is affected, and even the HARQ-ACK/NACK information cannot be correctly transmitted. Therefore, how to feed back a large amount of UCI information in an eCA scenario becomes an urgent problem to be resolved.

SUMMARY

Embodiments of the present disclosure provide an uplink control information transmission method and apparatus in carrier aggregation, and may be used to implement a feedback of UCI information in a carrier aggregation scenario.

According to a first aspect, an uplink control information transmission method in carrier aggregation is provided, including:

sending, by a base station, first indication information to a user equipment (UE), where the first indication information is used to instruct the UE to dynamically determine uplink control information UCI according to the first indication information; and allocating, by the base station, a PUCCH resource to the UE, where the PUCCH resource is used to transmit the UCI.

With reference to an implementation of the first aspect, in a first possible implementation of the first aspect, the first indication information is first-type indication information or second-type indication information; the first-type indication information is used to instruct the UE to determine UCI according to the first-type indication information when the base station generates downlink assignment index DAI information according to a quantity of scheduled carrier(s); and the second-type indication information is used to instruct the UE to determine UCI according to the second-type indication information when the base station generates the DAI information according to a quantity of scheduled codewords.

With reference to the first aspect or the first possible implementation of the first aspect, in a second possible implementation of the first aspect, the sending, by a base station, first indication information to the UE includes:

sending, by the base station, first configuration information to the UE, where the first configuration information includes the first indication information.

With reference to any one of the first aspect, or the first or the second possible implementation of the first aspect, in a third possible implementation of the first aspect, the sending, by a base station, first indication information to the UE includes: sending, by the base station, downlink control information DCI to the UE, where the DCI includes the first indication information.

With reference to any one of the first aspect, or the first to the third possible implementations of the first aspect, in a fourth possible implementation of the first aspect, the sending, by a base station, first indication information to the UE includes:

sending, by the base station, DCI encoded in a first manner to the UE, where the first manner corresponds to the first-type indication information, and in the first manner, a scrambling code is not added to a cyclic redundancy check CRC code that is generated during DCI encoding; or sending, by the base station, DCI encoded in a second manner to the UE, where the second manner corresponds to the second-type indication information, and in the second manner, a scrambling code is added to a CRC code that is generated during DCI encoding.

With reference to any one of the first aspect, or the first to the fourth possible implementations of the first aspect, in a fifth possible implementation of the first aspect, the allocating, by the base station, a PUCCH resource to the UE includes: sending, by the base station, second configuration information to the UE, where the second configuration information is used to configure a resource list for the UE, and the resource list includes a plurality of resource information groups; and sending, by the base station, second indication information to the UE, where the second indication information is used to indicate, to the UE, a PUCCH resource corresponding to one resource information group in the resource list.

With reference to any one of the first aspect, or the first to the fifth possible implementations of the first aspect, in a sixth possible implementation of the first aspect, the plurality of resource information groups are arranged according to different PUCCH formats, each PUCCH format corresponds to at least one resource information group, and each resource information group includes start address indication information and size indication information of one PUCCH resource; and the second indication information includes a resource index RI, and the RI is used to indicate, to the UE, a first resource information group corresponding to the RI.

With reference to any one of the first aspect, or the first to the sixth possible implementations of the first aspect, in a seventh possible implementation of the first aspect, the sending, by the base station, second indication information to the UE includes: sending, by the base station by using a transmit power control TPC field, the second indication information, that is, the RI corresponding to the first resource information group.

With reference to any one of the first aspect, or the first to the seventh possible implementations of the first aspect, in an eighth possible implementation of the first aspect, the plurality of resource information groups are arranged according to different PUCCH formats, each PUCCH format corresponds to at least one resource information group, and each resource information group includes start address indication information of one PUCCH resource; the second indication information includes an RI, and the RI is used to indicate, to the UE, a second resource information group corresponding to the RI; and the second indication information further includes a length index LI, and the LI is used to indicate, to the UE, a size of a PUCCH resource corresponding to the second resource information group.

With reference to any one of the first aspect, or the first to the eighth possible implementations of the first aspect, in a ninth possible implementation of the first aspect, the sending, by the base station, second indication information to the UE includes: determining, by the base station, two groups of TPC fields according to scheduled carrier(s), where one group is used to send the RI corresponding to the second resource information group, and the other group is used to send the LI indicating, to the UE, the size of the PUCCH resource corresponding to the second resource information group; or sending, by the base station, the RI and the LI by using an extended TPC field, where the extended TPC field includes more than 2 bits.

With reference to any one of the first aspect, or the first to the ninth possible implementations of the first aspect, in a tenth possible implementation of the first aspect, each resource information group in the resource list includes start address indication information and size indication information of one PUCCH resource; the second indication information includes an RI, and the RI is used to indicate, to the UE, a third resource information group corresponding to the RI; and the second indication information further includes a format index FI, and the FI is used to indicate, to the UE, a PUCCH format of a PUCCH resource corresponding to the third resource information group.

With reference to any one of the first aspect, or the first to the tenth possible implementations of the first aspect, in an eleventh possible implementation of the first aspect, the sending, by the base station, second indication information to the UE includes: determining, by the base station, two groups of TPC fields according to scheduled carrier(s), where one group is used to send the RI corresponding to the third resource information group, and the other group is used to send the FI indicating, to the UE, the PUCCH format of the PUCCH resource corresponding to the third resource information group; or sending, by the base station, the RI and the FI by using an extended TPC field, where the extended TPC field includes more than 2 bits.

With reference to any one of the first aspect, or the first to the eleventh possible implementations of the first aspect, in a twelfth possible implementation of the first aspect, each resource information group in the resource list includes start address indication information of one PUCCH resource; the second indication information includes an RI, and the RI is used to indicate, to the UE, a fourth resource information group corresponding to the RI; and the second indication information further includes an FI and an LI, the FI is used to indicate, to the UE, a PUCCH format of a PUCCH resource corresponding to the fourth resource information group, and the LI is used to indicate, to the UE, a size of the PUCCH resource corresponding to the fourth resource information group.

With reference to any one of the first aspect, or the first to the twelfth possible implementations of the first aspect, in a thirteenth possible implementation of the first aspect, the resource list includes two resource information groups; and the sending, by the base station, second indication information to the UE includes: determining, by the base station, two groups of TPC fields according to scheduled carrier(s), where one group is used to send the RI corresponding to the fourth resource information group and the FI indicating, to the UE, the PUCCH format of the PUCCH resource corresponding to the fourth resource information group, and the other group is used to send the LI indicating, to the UE, the size of the PUCCH resource corresponding to the fourth resource information group.

With reference to any one of the first aspect, or the first to the thirteenth possible implementations of the first aspect, in a fourteenth possible implementation of the first aspect, the determining, by the base station, two groups of TPC fields according to scheduled carriers includes: grouping, by the base station, the scheduled carriers into two groups according to an order of identification numbers of the scheduled carriers; and determining TPC fields on each of the two groups of scheduled carriers as one group of TPC fields.

With reference to any one of the first aspect, or the first to the fourteenth possible implementations of the first aspect, in a fifteenth possible implementation of the first aspect, the scheduled carrier(s) include a scheduled carrier whose identification number is odd and a scheduled carrier whose identification number is even; and the determining, by the base station, two groups of TPC fields according to scheduled carrier(s) includes: determining TPC fields on scheduled carrier(s) whose identification numbers are odd in the scheduled carrier(s) as one group of TPC fields; and determining TPC fields on scheduled carrier(s) whose identification numbers are even in the scheduled carrier(s) as the other group of TPC fields.

According to a second aspect, an uplink control information transmission apparatus in carrier aggregation is provided, including:

a first sending module, configured to send first indication information to a user equipment (UE), where the first indication information is used to instruct the UE to dynamically determine uplink control information UCI according to the first indication information; and a resource allocation module, configured to allocate a PUCCH resource to the UE, where the PUCCH resource is used to transmit the UCI.

With reference to an implementation of the second aspect, in a first possible implementation of the second aspect, the first indication information is first-type indication information or second-type indication information; the first-type indication information is used to instruct the UE to determine UCI according to the first-type indication information when the base station generates downlink assignment index DAI information according to a quantity of scheduled carrier(s); and the second-type indication information is used to instruct the UE to determine UCI according to the second-type indication information when the base station generates the DAI information according to a quantity of scheduled codewords.

With reference to the second aspect or the first possible implementation of the second aspect, in a second possible implementation of the second aspect, the first sending module is configured to send first configuration information to the UE, where the first configuration information includes the first indication information.

With reference to any one of the second aspect, or the first or the second possible implementation of the second aspect, in a third possible implementation of the second aspect, the first sending module is configured to send downlink control information DCI to the UE, where the DCI includes the first indication information.

With reference to any one of the second aspect, or the first to the third possible implementations of the second aspect, in a fourth possible implementation of the second aspect, the first sending module is configured to: send DCI encoded in a first manner to the UE, where the first manner corresponds to the first-type indication information, and in the first manner, a scrambling code is not added to a cyclic redundancy check CRC code that is generated during DCI encoding; or send DCI encoded in a second manner to the UE, where the second manner corresponds to the second-type indication information, and in the second manner, a scrambling code is added to a CRC code that is generated during DCI encoding.

With reference to any one of the second aspect, or the first to the fourth possible implementations of the second aspect, in a fifth possible implementation of the second aspect, the resource allocation module includes a configuration module, an indication module, and a second sending module; the configuration module is configured to generate second configuration information, where the second configuration information is used to configure a resource list for the UE, and the resource list includes a plurality of resource information groups; the indication module is configured to generate second indication information, where the second indication information is used to indicate, to the UE, a PUCCH resource corresponding to one resource information group in the resource list; and the second sending module is configured to send the second configuration information and the second indication information to the UE.

With reference to any one of the second aspect, or the first to the fifth possible implementations of the second aspect, in a sixth possible implementation of the second aspect, the plurality of resource information groups are arranged according to different PUCCH formats, each PUCCH format corresponds to at least one resource information group, and each resource information group includes start address indication information and size indication information of one PUCCH resource; and the second indication information includes a resource index RI, and the RI is used to indicate, to the UE, a first resource information group corresponding to the RI.

With reference to any one of the second aspect, or the first to the sixth possible implementations of the second aspect, in a seventh possible implementation of the second aspect, the second sending module is configured to send, by using a transmit power control TPC field, the second indication information, that is, the RI corresponding to the first resource information group.

With reference to any one of the second aspect, or the first to the seventh possible implementations of the second aspect, in an eighth possible implementation of the second aspect, the plurality of resource information groups are arranged according to different PUCCH formats, each PUCCH format corresponds to at least one resource information group, and each resource information group includes start address indication information of one PUCCH resource; the second indication information includes an RI, and the RI is used to indicate, to the UE, a second resource information group corresponding to the RI; and the second indication information further includes a length index LI, and the LI is used to indicate, to the UE, a size of a PUCCH resource corresponding to the second resource information group.

With reference to any one of the second aspect, or the first to the eighth possible implementations of the second aspect, in a ninth possible implementation of the second aspect, the second sending module is configured to: determine two groups of TPC fields according to scheduled carrier(s), where one group is used to send the RI corresponding to the second resource information group, and the other group is used to send the LI indicating, to the UE, the size of the PUCCH resource corresponding to the second resource information group; or send the RI and the LI by using an extended TPC field, where the extended TPC field includes more than 2 bits.

With reference to any one of the second aspect, or the first to the ninth possible implementations of the second aspect, in a tenth possible implementation of the second aspect, each resource information group in the resource list includes start address indication information and size indication information of one PUCCH resource; the second indication information includes an RI, and the RI is used to indicate, to the UE, a third resource information group corresponding to the RI; and the second indication information further includes a format index FI, and the FI is used to indicate, to the UE, a PUCCH format of a PUCCH resource corresponding to the third resource information group.

With reference to any one of the second aspect, or the first to the tenth possible implementations of the second aspect, in an eleventh possible implementation of the second aspect, the second sending module is configured to: determine two groups of TPC fields according to scheduled carrier(s), where one group is used to send the RI corresponding to the third resource information group, and the other group is used to send the FI indicating, to the UE, the PUCCH format of the PUCCH resource corresponding to the third resource information group; or send the RI and the FI by using an extended TPC field, where the extended TPC field includes more than 2 bits.

With reference to any one of the second aspect, or the first to the eleventh possible implementations of the second aspect, in a twelfth possible implementation of the second aspect, each resource information group in the resource list includes start address indication information of one PUCCH resource; the second indication information includes an RI, and the RI is used to indicate, to the UE, a fourth resource information group corresponding to the RI; and the second indication information further includes an FI and an LI, the FI is used to indicate, to the UE, a PUCCH format of a PUCCH resource corresponding to the fourth resource information group, and the LI is used to indicate, to the UE, a size of the PUCCH resource corresponding to the fourth resource information group.

With reference to any one of the second aspect, or the first to the twelfth possible implementations of the second aspect, in a thirteenth possible implementation of the second aspect, the resource list includes two resource information groups; and the second sending module is configured to determine two groups of TPC fields according to scheduled carrier(s), where one group is used to send the RI corresponding to the fourth resource information group and the FI indicating, to the UE, the PUCCH format of the PUCCH resource corresponding to the fourth resource information group, and the other group is used to send the LI indicating, to the UE, the size of the PUCCH resource corresponding to the fourth resource information group.

With reference to any one of the second aspect, or the first to the thirteenth possible implementations of the second aspect, in a fourteenth possible implementation of the second aspect, the second sending module is configured to: group the scheduled carriers into two groups according to an order of identification numbers of the scheduled carriers; and determine TPC fields on each of the two groups of scheduled carriers as one group of TPC fields.

With reference to any one of the second aspect, or the first to the fourteenth possible implementations of the second aspect, in a fifteenth possible implementation of the second aspect, the scheduled carrier(s) include a scheduled carrier whose identification number is odd and a scheduled carrier whose identification number is even; and the second sending module is configured to: determine TPC fields on scheduled carrier(s) whose identification numbers are odd in the scheduled carrier(s) as one group of TPC fields; and determine TPC fields on scheduled carrier(s) whose identification numbers are even in the scheduled carrier(s) as the other group of TPC fields.

According to the uplink control information transmission method and apparatus in carrier aggregation provided in the embodiments of the present disclosure, the base station sends the first indication information to the user equipment UE, to instruct the UE to dynamically determine the uplink control information UCI according to the first indication information, and the base station allocates the PUCCH resource to the UE to transmit the UCI. The embodiments of the present disclosure may be used to implement a feedback of UCI information in a carrier aggregation scenario, thereby improving performance of transmitting valid UCI information.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

In the embodiments of the present disclosure, the terms "first", "second", and the like are intended to distinguish between similar objects but do not necessarily indicate a specific order. It should be understood that the data termed in such a way is interchangeable in proper circumstances, so that the embodiments of the present disclosure described herein can be implemented in other orders than the order illustrated or described herein.

The embodiments of the present disclosure are applied to a feedback of UCI information in a CA or eCA scenario in LTE-A. In the LTE-A, a base station configures, by using higher layer signaling such as radio resource control (RRC) signaling, UE to receive downlink data on a plurality of CCs. Correspondingly, the UE needs to feed back HARQ-ACK/NACK information of the downlink data sent on the plurality of CCs. One of the plurality of downlink CCs configured by the base station by using the higher layer signaling is a primary CC (PCC), or may be referred to as a primary cell, PCell for short; and another CC is referred to as a secondary CC (SCC), or may be referred to as a secondary cell, SCell for short. The UE feeds back the HARQ-ACK/NACK information of the plurality of CCs by using a PUCCH resource allocated by the base station.

In the CA scenario, if PDSCH data is transmitted on an SCC, PUCCH sending is performed by using a PUCCH format 3. A PUCCH resource is allocated by using a hybrid method of semi-static configuration and dynamic indication. That is, some PUCCH format 3 resources may be explicitly configured for the UE by using RRC configuration signaling, and then a value of a transmit power control (TPC) field in downlink control information (DCI) transmitted on a physical downlink control channel (PDCCH) of a plurality of SCCs (at least one SCC) is used to indicate an actually used PUCCH format 3 resource (in this case, the indication information is referred to as a HARQ-ACK/NACK Resource Indicator (ARI)). The indication information indicates, to the user equipment, one of the some resources configured by using the RRC. To understand more clearly a technical problem to be resolved in the embodiments of the present disclosure, the following describes a feedback of UCI information in a carrier aggregation scenario in an existing protocol by using the following examples.

Figure 1:
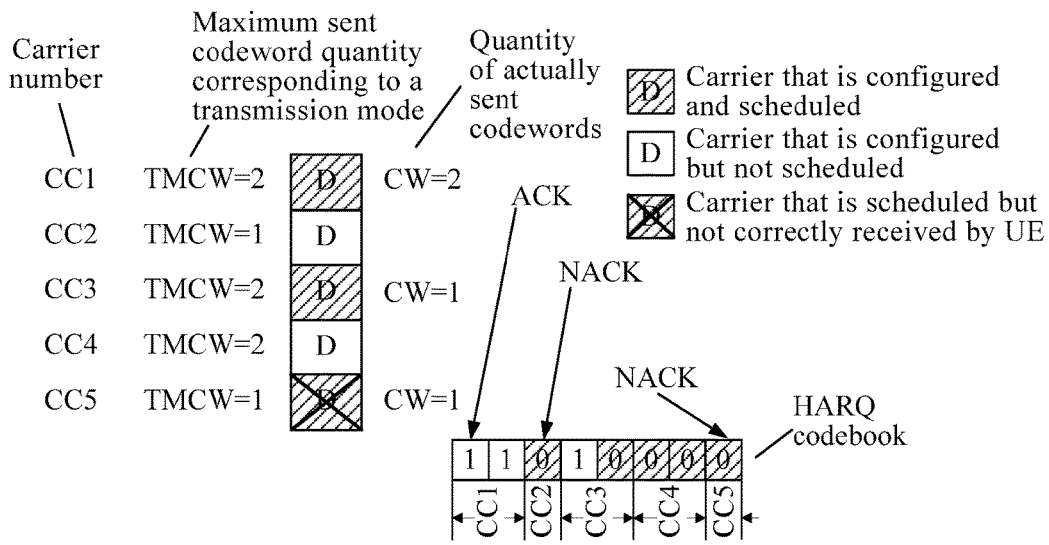
FIG. 1 is a schematic diagram of determining a codebook of HARQ-ACK/NACK information in an FDD mode in an LTE-A system according to a related technology.

FIG. 1 is a schematic diagram of determining a codebook of HARQ-ACK/NACK information in an FDD mode in an LTE-A system according to a related technology. Referring to FIG. 1, a base station configures five carriers for UE by using higher layer signaling, and maximum transmitted codeword (CW) quantities supported by transmission modes (TM) corresponding to the five carriers are sequentially 2, 1, 2, 2, and 1. Scheduled carriers are a CC1, a CC3, and a CC5. The UE correctly receives DCI information on the CC1 and the CC3, and correctly decodes two CWs sent on the CC1 and one CW sent on the CC3, but does not correctly receive DCI information sent on the CC5. Therefore, the UE may determine that the codebook of the HARQ-ACK/NACK information is "11010000", where information corresponding to "1" is an ACK, and information corresponding to "0" is a NACK. It may be learned that a size and a ranking of the HARQ-ACK/NACK information in the existing protocol are determined according to a quantity of configured carriers and a maximum codeword quantity and a carrier number corresponding to a TM of each configured carrier. In this method, when there is a configured carrier that is not scheduled (that is, not actually used for data transmission), or when a quantity of codewords transmitted on a carrier does not reach a maximum configuration, the HARQ-ACK/NACK information is still padded with some useless bits.

The "eCA" is an abbreviation of wireless LTE Carrier Aggregation Enhancement Beyond 5 Carriers provided by 3GPP in January 2015, indicating that a quantity of carriers that can be aggregated is greatly increased, and requiring that a maximum of 32 carriers are aggregated. In an eCA scenario, there are more configured carriers, and a maximum of 32 configured carriers may exist. If HARQ-ACK/NACK information is determined according to the method in the existing protocol, a required codebook of HARQ feedback information may be quite large. For example, for 32 configured carriers, a maximum of 638 bits are to be fed back. In addition, in the eCA scenario, it is further required that CSI information of a plurality of CCs can be fed back in one subframe. If the CSI information and the HARQ feedback information need to be transmitted in a same subframe, a size of UCI information is further increased. For brevity, only the HARQ feedback information is used as an example in the embodiments of the present disclosure.

After determining the codebook of the HARQ-ACK/NACK information, the UE needs to transmit the HARQ-ACK/NACK information to the base station by using a PUCCH resource allocated by the base station.

A current LTE protocol defines a total of seven PUCCH formats in three types, different PUCCH formats carry different UCI information content, and the UE chooses a PUCCH format according to information that needs to be transmitted. A first type is a format 1x, including a format 1, a format 1a, and a format 1b, and carrying SR information, or HARQ-ACK/NACK information, or SR information and HARQ-ACK/NACK information. A second type is a format 2x, including a format 2, a format 2a, and a format 2b, and carrying CSI or CSI and HARQ-ACK/NACK information. A third type is a format 3, used to carry multi-HARQ-ACK/NACK information in carrier aggregation (CA) and optional SR information or CSI information. A quantity of bits that can be carried by the PUCCH format 3 in the foregoing seven PUCCH formats is the largest, and is up to 22. It is impossible to satisfy a requirement of 639-bit HARQ feedback information that may need to be fed back when a maximum of 32 carriers are configured.

In view of this, a plurality of candidates for a new PUCCH format are provided during current discussion of standards. The candidates for the new PUCCH format include a PUSCH-based format, a multi-PRB PF3 (PUCCH format 3), a reduced-OCC PF3, and a multi-resource PF3. However, currently, a maximum carried bit quantity that needs to be supported by a new available PUCCH format may be 128, 256, 319, or 638. If a maximum quantity of bits that can be carried by a finally selected new PUCCH format is less than 638, the format still cannot satisfy a requirement of a quantity of bits that need to be carried for sending all HARQ feedback information. If a method for determining the codebook of the HARQ feedback information is not changed, even though the HARQ-ACK/NACK information is transmitted by using the new PUCCH format, data transmission load cannot be reduced, affecting transmission performance of feeding back valid information.

A quantity of bits that can be carried by a PUCCH format is limited. Therefore, the existing protocol provides a processing method for bundling the HARQ feedback information, to decrease a quantity of bits of the HARQ-ACK/NACK information. Specifically, for a CC on which two codewords are sent, an AND logical operation may be performed on ACK/NACK information corresponding to the two CWs sent in a same downlink subframe on the CC, to obtain 1-bit ACK/NACK information. In the protocol, this is referred to as "spatial HARQ-ACK/NACK bundling" processing, that is, spatial bundling of the HARQ feedback information.

It has been agreed in the current discussion of the standards that the codebook of the HARQ-ACK/NACK information in the eCA is dynamically determined according to scheduled carrier(s). That is, a HARQ codebook (including a size and a ranking), in a subframe, for feeding back the HARQ information may vary according to a scheduling case.

Figure 2:
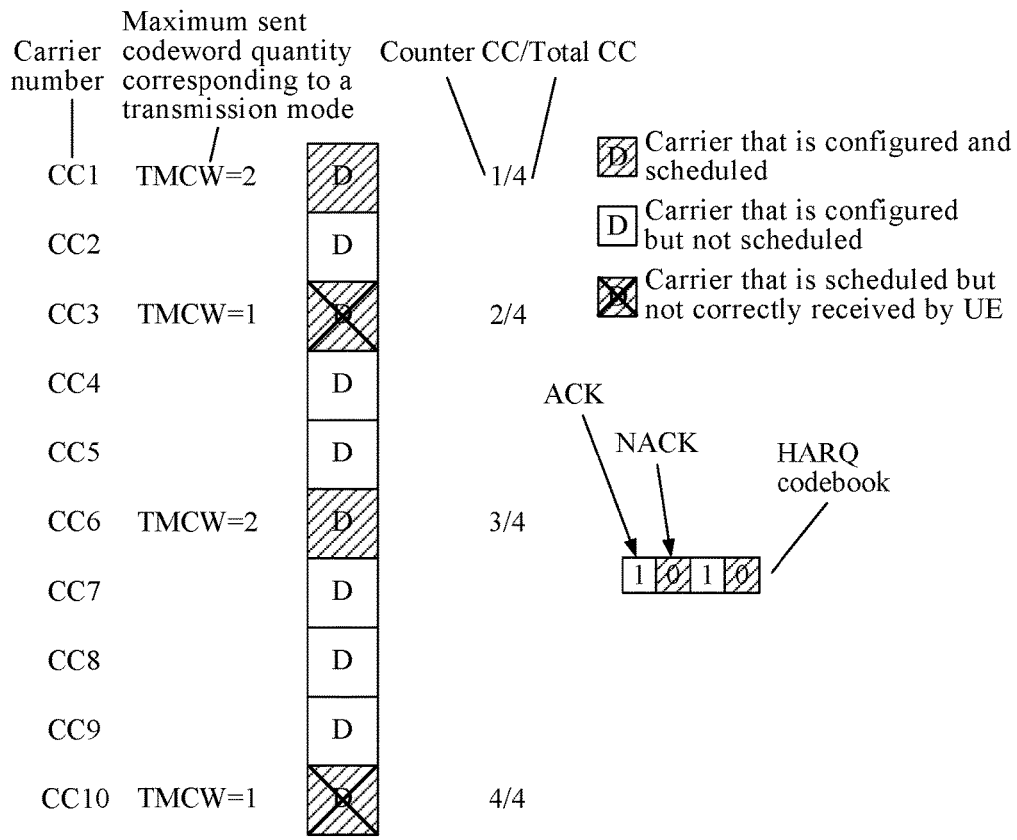
FIG. 2 is a schematic diagram of dynamically determining a codebook of HARQ-ACK/NACK information according to a quantity of scheduled carrier(s)

FIG. 2 is a schematic diagram of dynamically determining a codebook of HARQ-ACK/NACK information according to a quantity of scheduled carrier(s). This is referred to as a first solution below. In this solution, DCI information on a carrier includes a counter CC value, used to indicate a number of a scheduled carrier (also referred to as an accumulated quantity of scheduled carrier(s). The quantity of scheduled carrier(s) is consistent with a quantity of pieces of transmitted downlink DCI and a quantity of downlink PDSCHs. Therefore, the counter CC value may also represent an accumulated quantity of pieces of DCI or an accumulated quantity of PDSCHs. Information about the counter CC value is included in the DCI information used for downlink assignment. In addition, a total CC value represents a total quantity of all scheduled carrier(s) in the subframe. The value may be included in the DCI information used for the downlink assignment, or may be indicated in another manner. Herein, that the value is included in the DCI used for the downlink assignment is merely used as an example instead of a limitation. In an example shown in the figure, a base station configures 10 carriers for UE by using higher layer signaling, and a CC1, a CC3, a CC6, and a CC10 are scheduled carriers. In addition, the UE correctly receives DCI information on the CC1 and the CC6, learns that a counter CC value of the CC1 is 1 and that a counter CC value of the CC6 is 3, learns that total CC values of both the CC1 and the CC6 are 4, and correctly decodes, from a scheduled PDSCH, two CWs sent on each of the CC1 and the CC6, but does not correctly receive DCI information on the CC3 and the CC10. In this solution, to keep consistency between a quantity of HARQ bits fed back on a carrier on which DCI information is lost and a quantity of HARQ bits fed back on a carrier on which DCI information is not lost, spatial bundling is performed on HARQ feedback information on all CCs on each of which two codewords are transmitted. If bundling results of HARQ feedback information on both carriers, the CC1 and the CC6, are 1, the UE may determine, according to the counter values of the CC1 and the CC6, that two pieces of bundled HARQ feedback information are located on a first bit location and a third bit location respectively, and may learn, according to the total CC value 4, that a total length of the HARQ feedback information is 4 bits, thereby determining that the codebook of the HARQ-ACK/NACK information is "1010".

It may be learned that, in the first solution shown in FIG. 2, because an accumulated quantity of scheduled CWs cannot be learned by using information about a counter CC value in DCI and a quantity of CWs sent on a CC on which DCI is lost cannot be determined, spatial bundling is performed by default on HARQ feedback information on a scheduled carrier including two CWs. When either of two CWs transmitted on a scheduled carrier fails to be successfully decoded by the UE, the UE feeds back NACK information to the base station. After receiving the NACK information fed back by the UE, the base station considers that both of the CWs in the downlink subframe fail to be transmitted, and retransmits the two CWs in the downlink subframe. This causes some unnecessary retransmissions, and affects downlink throughput performance.

Figure 3:
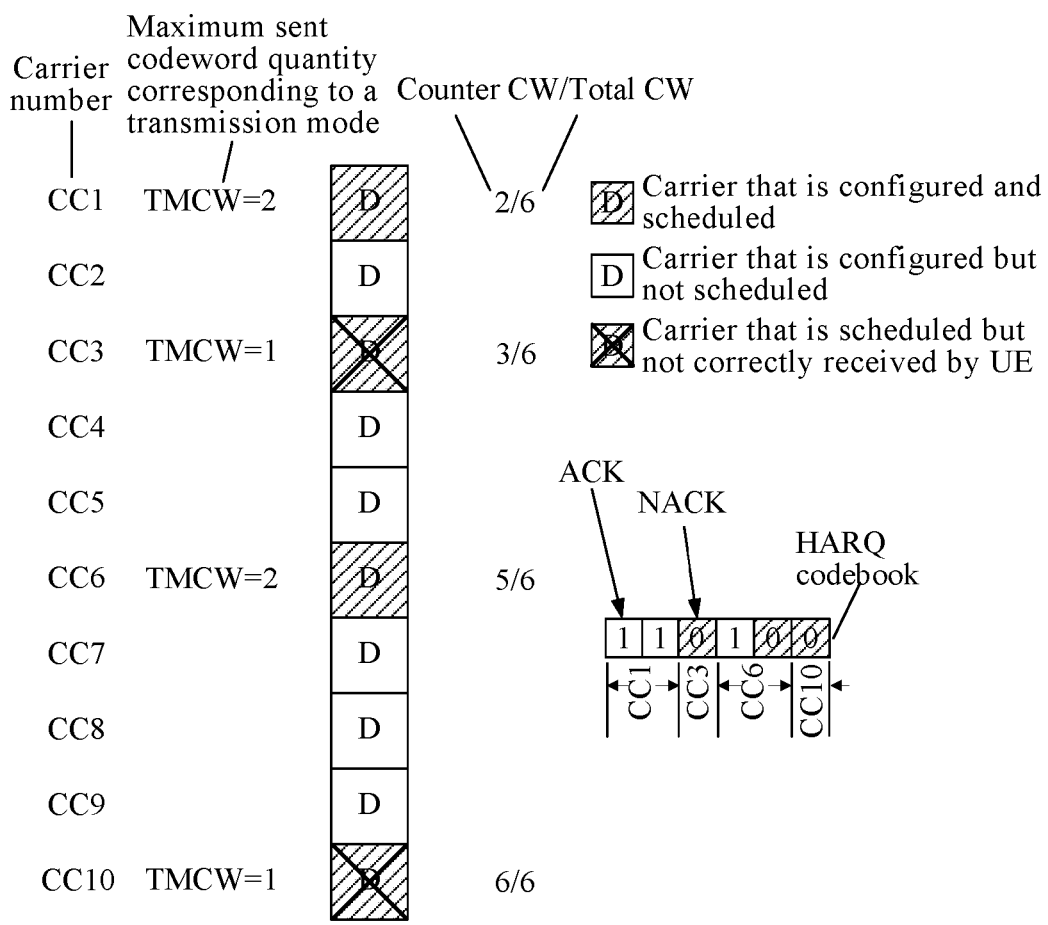
FIG. 3 is a schematic diagram of dynamically determining a codebook of HARQ-ACK/NACK information according to a quantity of scheduled CWs.

FIG. 3 is a schematic diagram of dynamically determining a codebook of HARQ-ACK/NACK information according to a quantity of scheduled CWs. This is referred to as a second solution below. In this solution, DCI information on a carrier includes information about a counter CW value, used to indicate a number of a scheduled CW (also referred to as an accumulated quantity of scheduled CWs). It should be noted that, for a carrier on which two CWs are scheduled, a counter CW value of the carrier reflects a number of a second scheduled CW, and after the number is correctly received by UE, a number of a first CW is also correctly received by default. The information about the counter CW value is included in the DCI information used for downlink assignment. In addition, information about a total CW value represents a total quantity of all scheduled CWs in the subframe. The value may be included in the DCI information used for the downlink assignment, or may be indicated in another manner. Herein, that the value is included in the DCI used for the downlink assignment is merely used as an example instead of a limitation. In an example shown in the figure, a base station configures 10 carriers for UE by using higher layer signaling, and a CC1, a CC3, a CC6, and a CC10 are scheduled carriers. In addition, the UE correctly receives DCI information on the CC1 and the CC6, learns that a counter CW value of the CC1 is 2 and a counter CW value of the CC6 is 5, learns that total CW values of both the CC1 and the CC6 are 6, and correctly decodes, from a scheduled PDSCH, two CWs sent on the CC1 and a first CW sent on the CC6, but does not correctly receive DCI information on the CC3 and the CC10. In this case, according to the counter CW value 2 of the CC1 and information, obtained by demodulating the DCI, that the two CWs are scheduled on the carrier, the UE can infer that the CC1 further corresponds to HARQ feedback information in which a counter CC value is 1. Then a location (also referred to as a ranking) of HARQ feedback information on the CC1 in an entire HARQ feedback codebook is a first bit location and a second bit location, and because both of the codewords are correctly decoded, the HARQ feedback information is '11'. Likewise, it may be learned that a location (also referred to as a ranking) of HARQ feedback information on the CC6 in the entire HARQ feedback codebook is a fourth bit location and a fifth bit location, and because only the first CW is correctly decoded and a second CW fails to be decoded, the HARQ feedback information is '10'. In addition, the UE may determine, according to the received total CW value 6, that a total quantity of bits of the HARQ feedback codebook is 6. Therefore, the UE finally determines that the codebook of the HARQ-ACK/NACK information is "110100".

In conclusion, the counter CC value and the total CC value in the first solution and the counter CW value and the total CW value in the second solution may be referred to as downlink assignment index (DAI) information in a carrier domain (cell-domain) or a frequency domain. In the first solution, the base station generates DAI information by using a scheduled carrier. In the second solution, the base station generates DAI information by using a scheduled codeword.

Figure 4A:
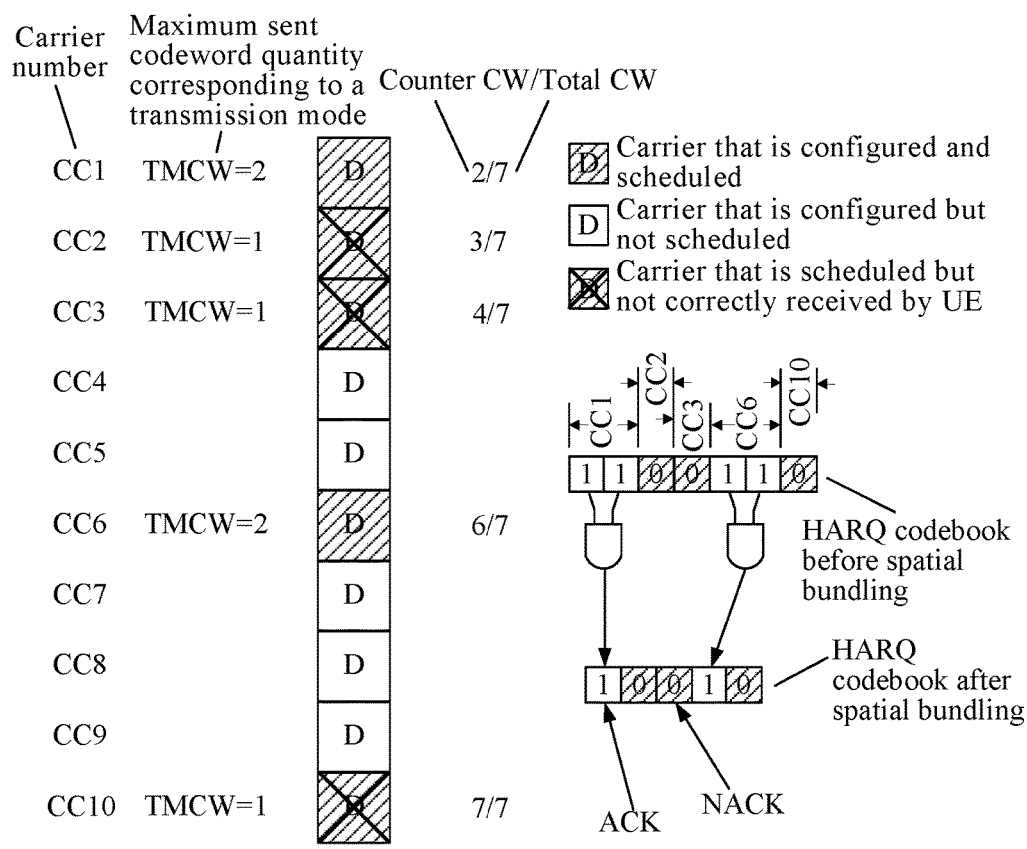
FIG. 4A and FIG. 4B are schematic diagrams of performing spatial bundling processing according to the solution shown in FIG. 3.
Figure 4B:
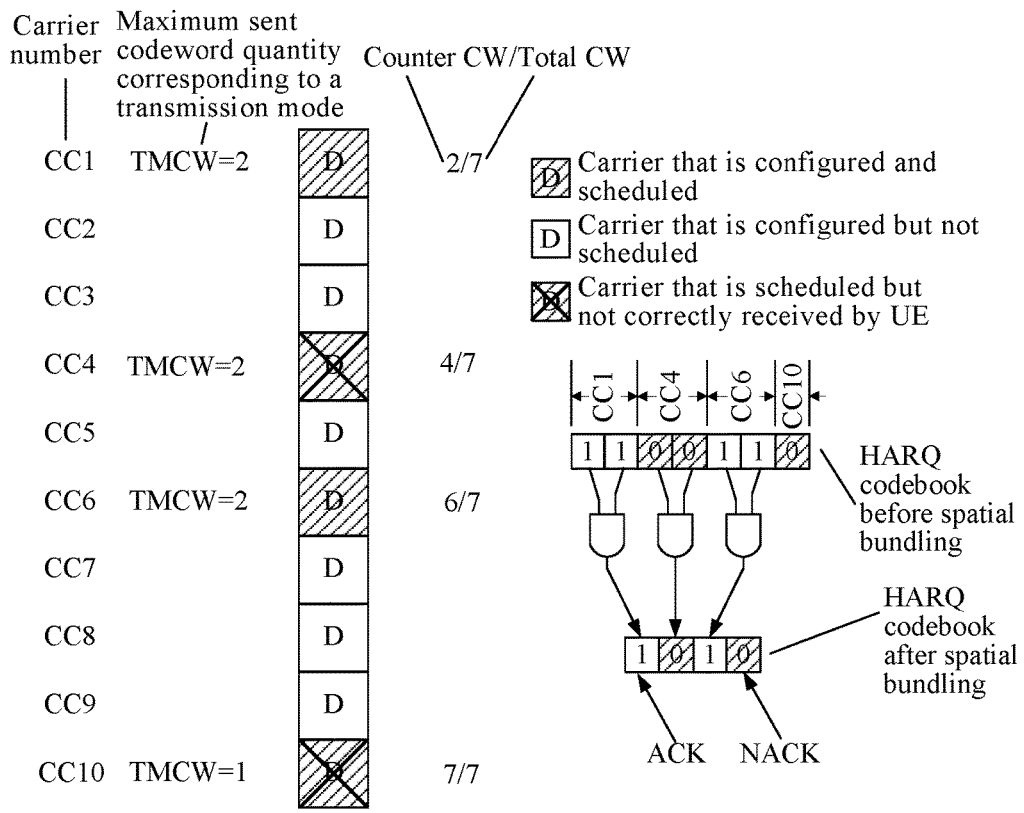

In the second solution shown in FIG. 3, if spatial bundling processing further needs to be performed on the HARQ feedback information, the UE may be uncertain about a codebook size of the HARQ feedback information, and therefore the base station and the UE have inconsistent understanding of the HARQ feedback codebook. For details, refer to two cases shown in FIG. 4A and FIG. 4B. If a plurality of codewords are lost, the UE cannot determine, by using received information about the counter CW values of the CC1 and the CC6, whether one CW on each of two carriers (that is, one CW on each of a CC2 and a CC3 in FIG. 4A) is lost, or two CWs on one carrier (that is, two CWs on a CC4 in FIG. 4B) are lost. Therefore, during the spatial bundling in the second solution, a quantity of bundled bits cannot be determined, and there may be 5 bits (FIG. 4A) or 4 bits (FIG. 4B). However, in this case, the base station clearly knows a scheduling case. Because the UE is uncertain about the quantity of bits of the bundled HARQ feedback information, a quantity of feedback bits may be inconsistent with an actual case, that is, the base station and the UE have inconsistent understanding of the HARQ feedback codebook, and the UE cannot accurately transmit the HARQ-ACK/NACK information.

In view of this, an embodiment of the present disclosure provides a UCI transmission method in carrier aggregation. A base station sends indication information to the UE, so that the UE selects, according to the indication information, a manner of determining a codebook of HARQ-ACK/NACK information.

An uplink control information transmission method in carrier aggregation provided in the following embodiment of the present disclosure is executed by a base station.

Figure 5:
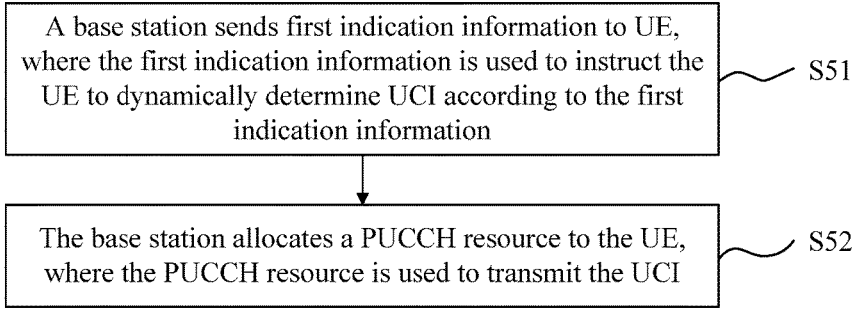
FIG. 5 is a flowchart of an uplink control information transmission method in carrier aggregation according to an embodiment of the present disclosure.

FIG. 5 is a flowchart of an uplink control information transmission method in carrier aggregation according to an embodiment of the present disclosure. As shown in FIG. 5, the uplink control information transmission method in carrier aggregation provided in this embodiment may include the following steps.

S51. A base station sends first indication information to the UE, where the first indication information is used to instruct the UE to dynamically determine UCI according to the first indication information.

Dynamic determining herein means that UCI information in each subframe for feeding back the UCI, particularly a codebook of HARQ feedback information, may vary according to cases of actually scheduled carrier(s) or codewords.

S52. The base station allocates a PUCCH resource to the UE, where the PUCCH resource is used to transmit the UCI.

In this embodiment, the first indication information may be first-type indication information or second-type indication information. When the first indication information is the first-type indication information, the UE determines UCI according to the first-type indication information when the base station generates DAI information according to a quantity of scheduled carrier(s). When the first indication information is the second-type indication information, the UE determines UCI according to the second-type indication information when the base station generates the DAI information according to a quantity of scheduled codewords. It should be noted that the DAI information herein includes information about a counter CC value in the first solution shown in FIG. 2 and a counter CW value in the second solution shown in FIG. 3. In addition, the DAI information may further include information about a total CC value in the first solution and information about a total CW value in the second solution shown in FIG. 3. This is not limited herein.

It should be noted that the base station clearly knows a quantity of bits of HARQ-ACK/NACK information that should be generated according to a current scheduling case, and clearly knows a to-be-indicated maximum quantity of bits carried by a new PUCCH format used for PUCCH transmission. Therefore, the base station may select, according to a relationship between a quantity of bits of HARQ-ACK/NACK information that needs to be actually fed back for current scheduling and the maximum quantity of bits carried by the new PUCCH format, a sending manner of the downlink assignment index (DAI) information.

Specifically, when the quantity of bits of the HARQ-ACK/NACK information that needs to be fed back is greater than the maximum quantity of bits carried by the new PUCCH format used for PUCCH transmission, the base station generates the DAI information according to the quantity of scheduled carrier(s), and notifies the UE of a generation manner of the DAI by using indication information (which may be referred to as the first-type indication information); and the UE determines, according to the indication information sent by the base station, to perform spatial bundling processing on the HARQ feedback information. When the quantity of bits of the HARQ-ACK/NACK information that needs to be fed back is less than or equal to the maximum quantity of bits carried by the new PUCCH format used for PUCCH transmission, the base station generates the DAI information according to the quantity of scheduled codewords, and notifies the UE of a generation manner of the DAI by using indication information (which may be referred to as the second-type indication information); and the UE determines, according to the indication information sent by the base station, not to perform spatial bundling processing on the HARQ feedback information. Therefore, the indication information sent by the base station to the UE may be further understood as indication information indicating whether the base station instructs the UE to perform spatial bundling on the HARQ information of the scheduled carrier(s). The indication information sent by the base station to the UE is referred to as the first indication information.

Optionally, the base station may send the first indication information to the UE by using RRC configuration signaling, or add a new data field to downlink control information (DCI) to send the first indication information. Alternatively, the base station may reuse an original data field in DCI to send the first indication information.

In another optional implementation, the base station may alternatively indicate, to the UE in different DCI encoding modes, whether the base station generates the DAI information according to the quantity of scheduled carrier(s) or generates the DAI information according to the quantity of scheduled codewords, that is, different encoding modes correspond to different types of indication information.

For example, when the base station encodes the DCI, an exclusive OR operation may be performed on a cyclic redundancy check (CRC) code that is generated during DCI encoding and a fixed sequence (for example, for an 8-bit CRC, the fixed sequence may be "10110110" in binary), or no processing may be performed on a CRC (which is equivalent to performing an exclusive OR operation by using a fixed sequence "00000000" in binary). That is, the base station adds a scrambling code to the CRC code, or does not add a scrambling code to the CRC code (which may be equivalent to scrambling the CRC by using different fixed sequences). When the UE decodes the DCI, if the UE can directly decode the DCI, it indicates that the base station does not add a scrambling code to the CRC code that is generated during DCI encoding, and accordingly, the UE can learn that the base station generates the DAI information according to the quantity of scheduled carrier(s). On the contrary, if the UE cannot directly decode the DCI, but can correctly decode the DCI by using the known fixed sequence "10110110", it indicates that the base station adds a scrambling code to the CRC code that is generated during DCI encoding, and accordingly, the UE can learn that the base station generates the DAI information according to the quantity of scheduled codewords.

According to the uplink control information transmission method in carrier aggregation provided in this embodiment, the base station sends the indication information to the UE, and the UE dynamically determines a codebook of the UCI (that is, the HARQ-ACK/NACK information) according to the indication information, thereby improving performance of transmitting valid HARQ-ACK/NACK information.

As described above, the base station currently allocates a PUCCH resource to the UE. In a CA scenario, the base station may explicitly configure some resources for the UE by using the RRC configuration signaling, and then indicate, to the user equipment by using HARQ-ACK/NACK resource indicator (ARI) information, one of the some resources configured by using the RRC.

In a CA scenario in an existing LTE-A system, a maximum of five carriers are configured, and a PUCCH resource is configured by using the RRC, or configured by using the RRC and an ARI indicator together. In an existing protocol, an RRC signaling unit used for resource configuration is:

CHOICE indicates that either of a format 3 and channelSelection is selected as a PUCCH format. For example, the format 3 is selected. Four resources (SEQUENCE (SIZE(1 . . . 4)) OF INTEGER (0 . . . 549)) are configured, and each resource is represented by one INTEGER value.

In the existing protocol, the ARI information is sent by reusing a TPC field in downlink control information (DCI) in the LTE-A. Specifically, reusing the TPC field in the DCI means sending the ARI information in a TPC field in DCI on an SCC while a power control command in a TPC field in DCI on a PCC is still sent to ensure that the base station can control PUCCH transmit power of the UE.

Currently, in the LTE-A system, the protocol further specifies that both duplex modes: a frequency division duplex (FDD) mode and a time division duplex (TDD) mode need to be supported in the LTE-A system. Specifically, in the FDD mode in the LTE-A system, one uplink subframe is used to feed back HARQ-ACK/NACK information of only one downlink subframe; and in the TDD mode in the LTE-A system, each of some uplink subframes needs to be used to feed back HARQ-ACK information of a plurality of downlink subframes.

Figure 6A:
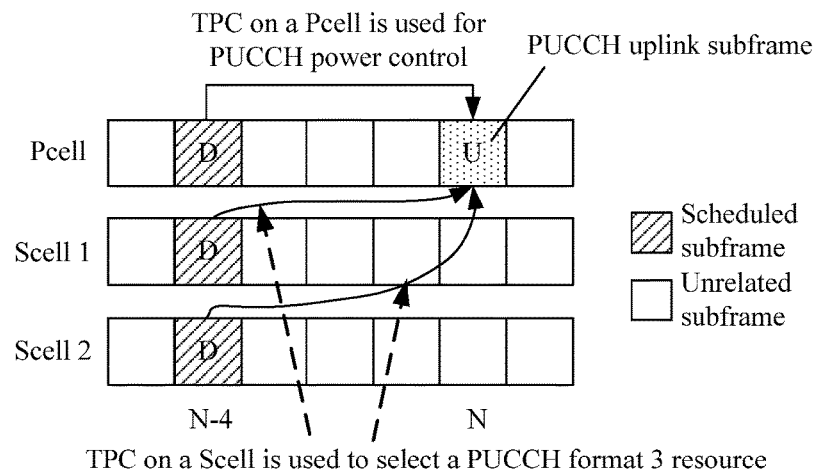
FIG. 6A is a schematic diagram of an ARI indicator in an FDD mode in an LTE-A system according to a related technology.

FIG. 6A is a schematic diagram of an ARI indicator in an FDD mode in an LTE-A system according to a related technology. In the figure, N−4 and N represent frame numbers, and a time interval between downlink PDSCH data and an uplink feedback in the FDD is four subframes. As shown in FIG. 6A, in the FDD mode, all PUCCH TPC (TPC command for PUCCH) fields in downlink control information received on a PCC are used for PUCCH power control, and all PUCCH TPC fields in downlink DCI received on all SCCs are used to instruct to select specific PUCCH format 3 resources. In addition, PUCCH TPC field values received by UE on all the SCCs in a same subframe need to be the same. For a PUCCH TPC field value, refer to a meaning of a TPC field value shown in Table 1.

```
    PUCCH-ConfigDedicated-v1020 ::=    SEQUENCE{
       pucch-Format-r10    CHOICE {
          format3-r10           SEQUENCE {
             n3PUCCH-AN-List-r10    SEQUENCE (SIZE (1..4)) OF INTEGER
(0..549) OPTIONAL,-- Need ON
             twoAntennaPortActivatedPUCCH-Format3-r10       CHOICE {
                release         NULL,
                setup           SEQUENCE {
                n3PUCCH-AN-ListP1-r10    SEQUENCE  (SIZE  (1..4))  OF
INTEGER (0..549)
                }
             }         OPTIONAL -- Need ON
          },
          channelSelection-r10       SEQUENCE {
             n1PUCCH-AN-CS-r10          CHOICE {
             release                    NULL,
             setup                      SEQUENCE {
             n1PUCCH-AN-CS-List-r10     SEQUENCE (SIZE(1..2)) OF
N1PUCCH-AN-CS-r10
             }
          }         OPTIONAL -- Need ON
          }
       }         OPTIONAL,-- Need OR
       twoAntennaPortActivatedPUCCH-Format1a1b-r10    ENUMERATED {true}
    OPTIONAL,-- Need OR
       simultaneousPUCCH-PUSCH-r10 ENUMERATED {true}     OPTIONAL,
-- Need OR
       n1PUCCH-AN-RepP1-r10       INTEGER (0..2047)   OPTIONAL --
Need OR
       }
```

TABLE 1

Meaning of a TPC field value

| TPC field value | Corresponding PUCCH resource value |
|---|---|
| '00' | Higher layer configured first PUCCH resource value |
| '01' | Higher layer configured second PUCCH resource value |
| '10' | Higher layer configured third PUCCH resource value |
| '11' | Higher layer configured fourth PUCCH resource value |

Figure 6B:
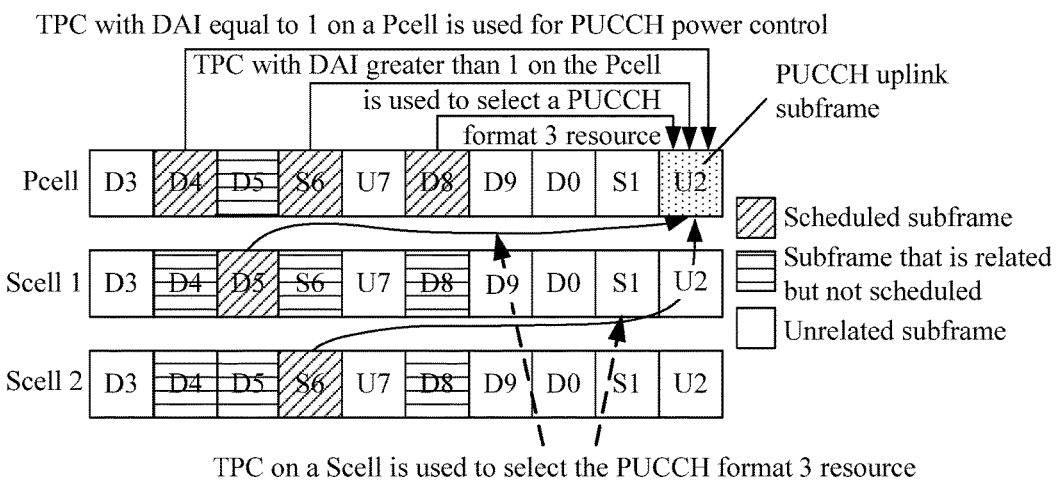
FIG. 6B is a schematic diagram of an ARI indicator in a TDD mode in an LTE-A system according to a related technology.

FIG. 6B is a schematic diagram of an ARI indicator in a TDD mode in an LTE-A system according to a related technology. As shown in FIG. 6B, in the TDD mode, all PUCCH TPC fields in downlink DCI that is received on a PCC and whose downlink assignment index (DAI) is equal to 1 are used for PUCCH power control; and all PUCCH TPC fields in downlink DCI that is received on the PCC and whose DAI is greater than 1 and all PUCCH TPC fields in downlink DCI received on all SCCs are used to instruct to select specific PUCCH format 3 resources. In addition, all PUCCH TPC fields in the downlink DCI that is received by UE on the PCC and whose DAI is greater than 1 need to be the same as the PUCCH TPC fields received on the SCCs. A subframe S is a special subframe in the TDD mode, and may also be used to transmit the downlink control information.

It should be noted that, in the existing protocol, a TPC field, on each carrier, used for an ARI indicator includes only 2 bits, and there are four available resources. The ARI indicator is used to select one resource from the four available resources as a resource for sending UCI.

As described above, a quantity of UCI information bits that can be carried by a PUCCH format 3 in seven PUCCH formats defined in the existing protocol is the largest, and a maximum of 22 bits are carried. In the PUCCH format 3 transmission format, after being encoded, 22-bit original information needs to be carried on only one physical resource block (PRB) pair. Therefore, in an existing CA scenario in which a maximum of five carriers are configured, each PUCCH format occupies resources of one PRB pair. In an eCA scenario, a maximum of 32 CCs can be configured, and each subframe can be used to feed back CSI information of a plurality of CCs. Therefore, UCI information fed back by using a PUCCH is greatly increased, and may occupy resources of more than one PRB pair.

In a method for feeding back HARQ-ACK/NACK information provided in the embodiment shown in FIG. 5 of the present disclosure, a codebook of the HARQ-ACK/NACK information may be dynamically determined according to a quantity of scheduled carrier(s) or a quantity of scheduled codewords. This means that a resource occupied by a PUCCH used for HARQ-ACK/NACK transmission in each subframe changes, and a different PUCCH format may be selected.

To support the method for feeding back HARQ-ACK/NACK information provided in the embodiment shown in FIG. 5 of the present disclosure, a base station further needs to allocate a PUCCH resource to the UE, and the HARQ-ACK/NACK information is transmitted by using the PUCCH resource.

In view of this, an embodiment of the present disclosure further provides resource allocation and PUCCH format indication of a new PUCCH format designed for eCA. It may be understood that a PUCCH resource allocation method in carrier aggregation provided in this embodiment is also applicable to an existing scenario in which a maximum of five carriers are aggregated. The PUCCH resource allocation method in carrier aggregation provided in this embodiment is executed by a base station.

Figure 7:
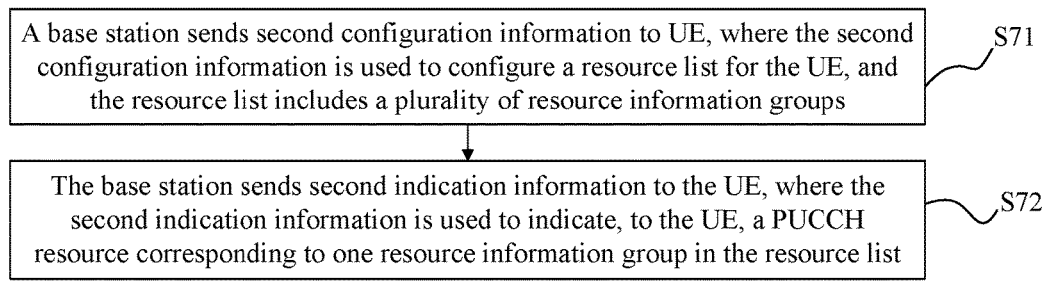
FIG. 7 is a flowchart of a PUCCH resource allocation method in carrier aggregation according to an embodiment of the present disclosure.

FIG. 7 is a flowchart of a PUCCH resource allocation method in carrier aggregation according to an embodiment of the present disclosure. As shown in FIG. 7, the method may include the following steps:

S71. A base station sends second configuration information to the UE, where the second configuration information is used to configure a resource list for the UE, and the resource list includes a plurality of resource information groups.

S72. The base station sends second indication information to the UE, where the second indication information is used to indicate, to the UE, a PUCCH resource corresponding to one resource information group in the resource list.

In this embodiment, the base station may configure some resources for the UE by using RRC configuration signaling, that is, the base station may configure a PUCCH resource list for the UE by using the RRC configuration signaling. The resource list includes a plurality of resource information groups, and each resource information group corresponds to one PUCCH resource.

In addition, in this embodiment, the base station can dynamically determine, according to scheduled carrier(s), a codebook size of HARQ feedback information sent by the UE. Therefore, according to different codebook sizes, in different radio channel conditions, PUCCH resources of different PUCCH resource sizes or different PUCCH formats may be selected for use from the PUCCH resource list configured by the base station for the UE. It should be noted that, a PUCCH resource size herein refers to a quantity of PRB pairs, and because allocated resources in this embodiment are consecutive, the PUCCH resource size may also be referred to as a length of a PRB pair. Specifically, the second indication information may be used to indicate, to the UE, the PUCCH resource corresponding to the resource information group in the resource list. Specifically, the second indication information may be ARI information.

It should be noted that a method for determining a codebook size of UCI information carried on a PUCCH has relatively great impact on a resource allocation manner, and the codebook size is a quantity of UCI information bits. Herein, determining a HARQ-ACK/NACK codebook size is used as an example for describing an application scenario of this embodiment. In an existing protocol, the HARQ-ACK/NACK codebook size depends on a quantity of configured carriers and a transmission mode (TM) of each carrier. These parameters are semi-statically configured. Therefore, it may be considered that the HARQ-ACK/NACK codebook size is also semi-statically configured. When a configuration is not changed, codebook sizes of a user in all subframes are the same. However, different PUCCH formats have different performance for different codebook sizes. This means that if a plurality of PUCCH formats are considered for use, different PUCCH formats may be used for different subframes, so as to optimize performance.

It may be understood that the base station may determine the codebook size of the UCI information according to a quantity of scheduled carrier(s) or a quantity of scheduled codewords, and then determine, with reference to a current channel environment and another parameter, size information and format information of a PUCCH resource required by the UE. This is not specifically limited in this embodiment.

According to the PUCCH resource allocation method in carrier aggregation provided in this embodiment, the base station configures a plurality of PUCCH resources for the UE by using the RRC configuration signaling, determines the codebook size of the UCI information according to the quantity of scheduled carrier(s) or the quantity of scheduled codewords, then determines an actual requirement of the UE with reference to the current channel environment, and completes, by using indication of the second indication, selection of a PUCCH resource and dynamic and flexible determining of a PUCCH resource size and a PUCCH format, instead of allocating a PUCCH resource of a fixed size and a fixed format to the UE. This can not only satisfy a requirement of an eCA scenario in which UCI fed back by the UE by using the PUCCH may occupy resources of more than one PRB pair, but can also improve utilization of the PUCCH resource.

In addition, in a related technology, a PUCCH format can only be semi-statically configured in carrier aggregation. However, according to the resource allocation method in carrier aggregation provided in this embodiment, different PUCCH formats may be used for different subframes, and a plurality of variable candidates for a new PUCCH format can be supported, so that system performance is optimized.

In this embodiment, the base station preconfigures the resource list for the UE by using the RRC configuration signaling, and different resource information groups may correspond to a same PUCCH format, or different resource information groups may correspond to different PUCCH formats. Further, the following provides a detailed description by using specific examples.

Figure 8:
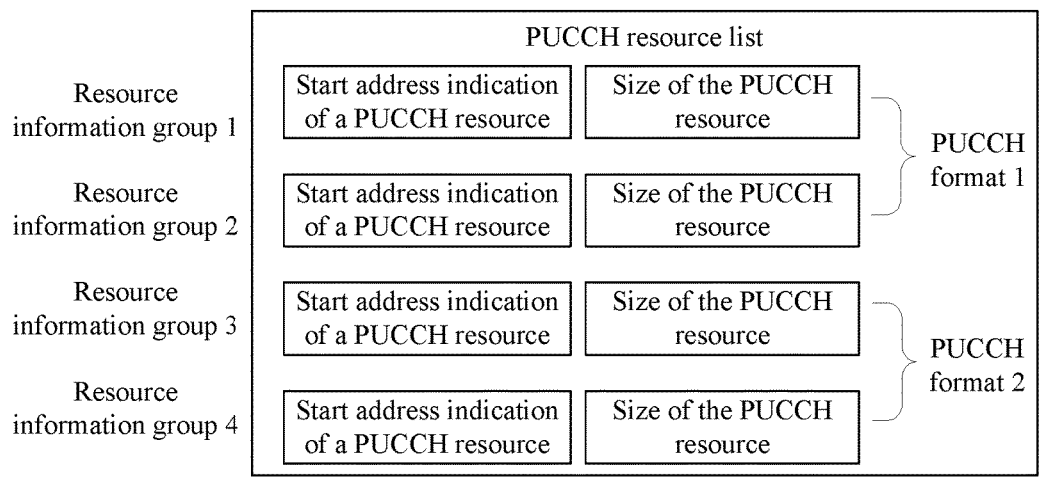
FIG. 8 is a schematic diagram of a first PUCCH resource list configured for UE by using RRC configuration signaling.

FIG. 8 is a schematic diagram of a first PUCCH resource list configured for UE by using RRC configuration signaling. A plurality of resource information groups in the resource list are arranged according to two different PUCCH formats. Each PUCCH format corresponds to two resource information groups, and each resource information group includes start address indication information and size indication information of one PUCCH resource. The RRC configuration signaling may be written in the following form. Apparently, the following signaling content is merely used as an example for describing the present disclosure, instead of a limitation to the present disclosure.

For example, the PUCCH resource list may be configured for the UE by using the following RRC configuration information elements:

```
        PUCCH-ConfigDedicated-v13x0::=SEQUENCE{
        pucch-Format-r13    SEQUENCE{
        Multi-PRB-PF3-r13   SEQUENCE{
        Multi-PRB-PF3-AN-List-r13           SEQUENCE(SIZE(1..2))
OF PUCCHResourceInfo
            PUCCHResourceInfo::=SEQUENCE{
            ResourceStart    INTEGER(0..549),
            ResourceLen      INTEGER(0..5)
                   }
        },
        PUSCH-based-format-r13 SEQUENCE {
            PUSCH-based-format-AN-List-r13  SEQUENCE  (SIZE
(1..2))    OF PUCCHResourceInfo
            PUCCHResourceInfo ::= SEQUENCE {
            ResourceStart    INTEGER(0..549),
            ResourceLen      INTEGER(0..5)
                   }
        },
        }
        }
```

Further, after determining size information and format information of a PUCCH resource required by the UE, a base station may select, from the PUCCH resource list, a first resource information group whose size indication information and PUCCH format are the same as the size information and the format information of the PUCCH resource required by the UE, and then send a resource index (RI) corresponding to the first resource information group to the UE by using second indication information, and the UE obtains, according to indication of the second indication, the PUCCH resource corresponding to the first resource information group.

For example, if the base station determines that the PUCCH resource required by the UE is of a multi-PRB PF3 format and occupies two PRB pairs, the base station may send, to the UE by using the second indication information, an RI corresponding to a resource information group 1 shown in FIG. 8. The UE obtains, according to the indication of the second indication information, a PUCCH resource corresponding to the resource information group 1.

It should be noted that an ARI information sending method in a related technology may be used to send the second indication information to the UE. For example, a TPC field in DCI in LTE may be used to send the second indication information. It may be understood that, in an existing protocol, a TPC field, on each carrier, used for an ARI indicator includes 2 bits, and one-in-four resource selection can be implemented.

Figure 9:
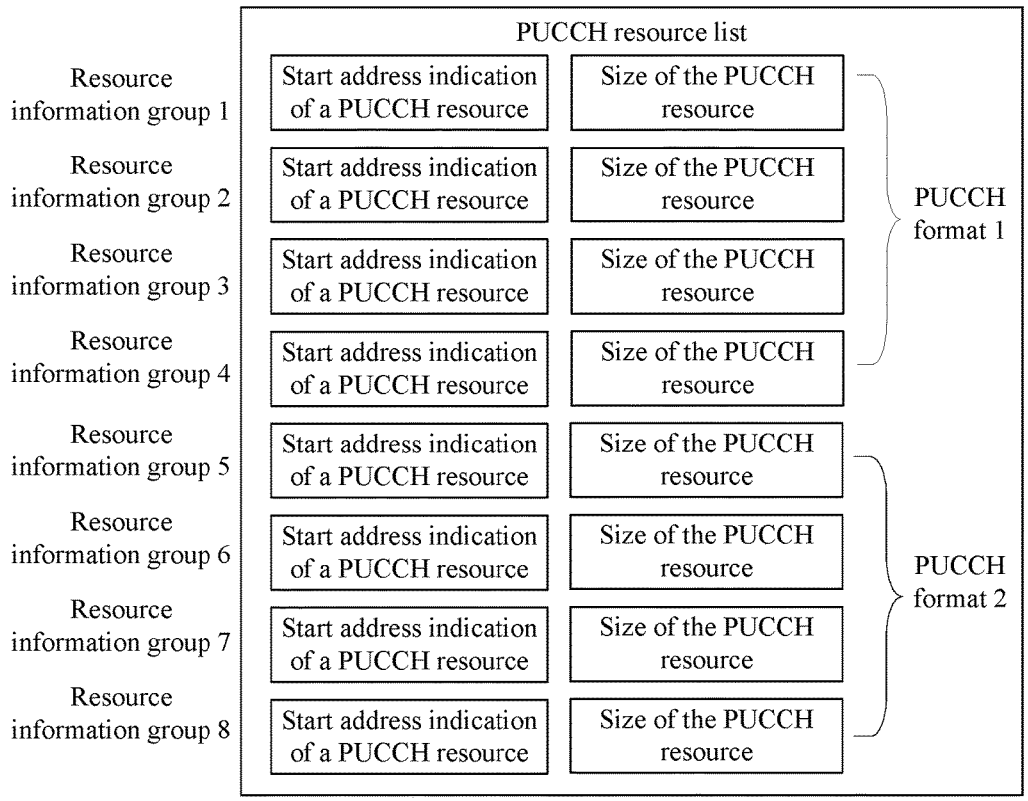
FIG. 9 is a schematic diagram of a second PUCCH resource list configured for UE by using RRC configuration signaling.

FIG. 9 is a schematic diagram of a second PUCCH resource list configured for UE by using RRC configuration signaling. A plurality of resource information groups in the resource list are arranged according to two different PUCCH formats. Each PUCCH format corresponds to four resource information groups, and each resource information group includes start address indication information and size indication information of one PUCCH resource.

Further, after determining size information and format information of a PUCCH resource required by the UE, a base station may select, from the PUCCH resource list, a second resource information group whose size indication information and PUCCH format are the same as the size information and the format information of the PUCCH resource required by the UE, and then send a resource index (RI) corresponding to the second resource information group to the UE by using second indication information, and the UE obtains, according to indication of the second indication, the PUCCH resource corresponding to the second resource information group.

In the case shown in FIG. 9, a PUCCH resource corresponding to one resource information group in eight resource information groups needs to be selected. However, in an existing protocol, a TPC field, on each carrier, used for an ARI indicator includes only 2 bits, and only one-in-four resource selection can be implemented. Therefore, if the existing TPC field used for the ARI indicator is used to send the second indication information, selection of a PUCCH resource corresponding to one resource information group in the eight resource information groups cannot be implemented.

In a preferred implementation, two groups of TPC fields may be used to send the second indication information. One group of TPC fields are used to send the RI corresponding to the second resource information group, and for a PUCCH TPC field value, refer to a meaning of a first group of TPC field values shown in Table 2. The other group of TPC fields are used to send a PUCCH format index (FI) corresponding to the second resource information group, and for a PUCCH TPC request field value, refer to a meaning of a second group of TPC field values shown in Table 3. Apparently, the meanings of the TPC field values listed in Table 2 and Table 3 are merely used as examples for describing the present disclosure, instead of limitations to the present disclosure.

TABLE 2

Meaning of a first group of TPC field values

| TPC field value | Corresponding PUCCH resource value |
|---|---|
| '00' | Higher layer configured first PUCCH resource value |
| '01' | Higher layer configured second PUCCH resource value |
| '10' | Higher layer configured third PUCCH resource value |
| '11' | Higher layer configured fourth PUCCH resource value |

TABLE 3

Meaning of a second group of TPC field values

| TPC field value | Corresponding PUCCH resource format value |
|---|---|
| '00' | PUCCH format 3 |
| '01' | Multi-PRB PF3 |
| '10' | PUSCH-based |
| '11' | Reduced OCC |

In another optional implementation, the base station may alternatively send, by using an extended TPC field, the RI and the FI corresponding to the second resource information group. For example, at least 1 bit may be added to the existing TPC field to obtain the extended TPC field, original 2 bits are used to send the RI corresponding to the second resource information group, and the newly added bit is used to send the FI corresponding to the second resource information group. For a specific extended PUCCH TPC field value, refer to a meaning of an extended TPC field value shown in Table 4. It may be learned, according to a meaning, shown in Table 4, of a TPC field value when a first-type extended TPC field includes 3 bits, that newly added 1 bit may be used to indicate two different formats of PUCCH resources. Apparently, a meaning of a TPC field value when the extended TPC field includes 4 bits may be further obtained according to the meaning, shown in Table 4, of the TPC field value when the first-type extended TPC field includes 3 bits. That is, newly added 2 bits may be used to indicate four different formats of PUCCH resources.

TABLE 4

Meaning of a first-type extended TPC field value

| TPC field value | Corresponding indication information |
|---|---|
| '000' | Resource information group 1 of a PUCCH format 1 |
| '001' | Resource information group 2 of a PUCCH format 1 |
| '010' | Resource information group 3 of a PUCCH format 1 |
| '011' | Resource information group 4 of a PUCCH format 1 |
| '100' | Resource information group 1 of a PUCCH format 2 |
| '101' | Resource information group 2 of a PUCCH format 2 |
| '110' | Resource information group 3 of a PUCCH format 2 |
| '111' | Resource information group 4 of a PUCCH format 2 |

Figure 10:
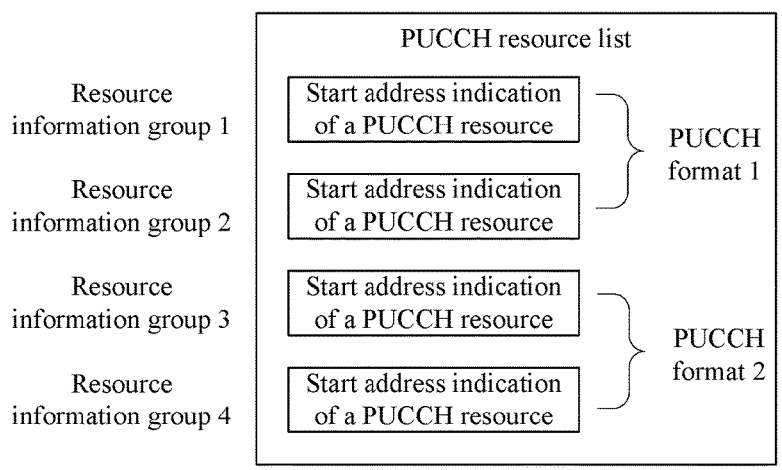
FIG. 10 is a schematic diagram of a third PUCCH resource list configured for UE by using RRC configuration signaling.

FIG. 10 is a schematic diagram of a third PUCCH resource list configured for UE by using RRC configuration signaling. Four resource information groups in the resource list are arranged according to different PUCCH formats. Each PUCCH format corresponds to two resource information groups, and each resource information group includes start address indication information of one PUCCH resource. Likewise, in a schematic diagram of a PUCCH resource list that is not shown in this embodiment, alternatively, each PUCCH format may correspond to four resource information groups, and each resource information group includes start address indication information of one PUCCH resource.

Further, after determining size information and format information of a PUCCH resource required by the UE, a base station may select, from the PUCCH resource list, a third resource information group whose PUCCH format is the same as the format information of the PUCCH resource required by the UE, and then send an RI corresponding to a second resource information group to the UE by using second indication information, and the UE obtains, according to indication of the second indication information, the PUCCH resource corresponding to the third resource information group. In addition, the base station further sends, to the UE by using the second indication information, a length index (LI) of the PUCCH resource corresponding to the size information of the PUCCH resource required by the UE, so as to indicate, to the UE, a size of the PUCCH resource corresponding to the third resource information group.

Likewise, it should be noted that an ARI information sending method in a related technology may be used to send the second indication information to the UE. For example, a TPC field in DCI in LTE may be used to send the second indication information. In the case shown in FIG. 10, both the RI corresponding to the third resource information group and the LI corresponding to the third resource information group need to be indicated to the UE by using the second indication information.

In a preferred implementation, two groups of TPC fields may be used to send the second indication information. One group of TPC fields are used to send the RI corresponding to the third resource information group, and for a TPC request PUCCH field value, refer to the meaning of the first group of TPC field values shown in Table 2. The other group of TPC fields are used to send the LI indicating, to the UE, the size of the PUCCH resource corresponding to the third resource information group, and for a TPC request PUCCH field value, refer to a meaning of a third group of TPC field values shown in Table 5.

TABLE 5

Meaning of a third group of TPC field values

| TPC field value | Corresponding PUCCH resource size value |
|---|---|
| '00' | One PRB pair |
| '01' | Two PRB pairs |
| '10' | Three PRB pairs |
| '11' | Four PRB pairs |

In another optional implementation, the base station may alternatively send, by using an extended TPC field, the RI corresponding to the second resource information group and the LI indicating, to the UE, the size of the PUCCH resource corresponding to the second resource information group. For example, at least 1 bit may be added to the existing TPC field to obtain the extended TPC field, original 2 bits are used to send the RI corresponding to the second resource information group, and the newly added bit is used to send the LI indicating, to the UE, the size of the PUCCH resource corresponding to the second resource information group. For a specific extended TPC request PUCCH field value, refer to a meaning of a second-type extended TPC field value shown in Table 6. It may be learned, according to a meaning, shown in Table 6, of a TPC field value when the second-type extended TPC field includes 3 bits, that newly added 1 bit may be used to indicate two different sizes of PUCCH resources. Apparently, a meaning of a TPC field value when the extended TPC field includes 4 bits may be further obtained according to the meaning, shown in Table 6, of the TPC field value when the second-type extended TPC field includes 3 bits. That is, newly added 2 bits may be used to indicate four different sizes of PUCCH resources.

TABLE 6

Meaning of a second-type extended TPC field value

| TPC field value | Corresponding indication information |
|---|---|
| '000' | Resource information group 1, one PRB pair |
| '001' | Resource information group 1, two PRB pairs |
| '010' | Resource information group 2, one PRB pair |
| '011' | Resource information group 2, two PRB pairs |
| '100' | Resource information group 3, one PRB pair |
| '101' | Resource information group 3, two PRB pairs |
| '110' | Resource information group 4, one PRB pair |
| '111' | Resource information group 4, two PRB pairs |

Figure 11:
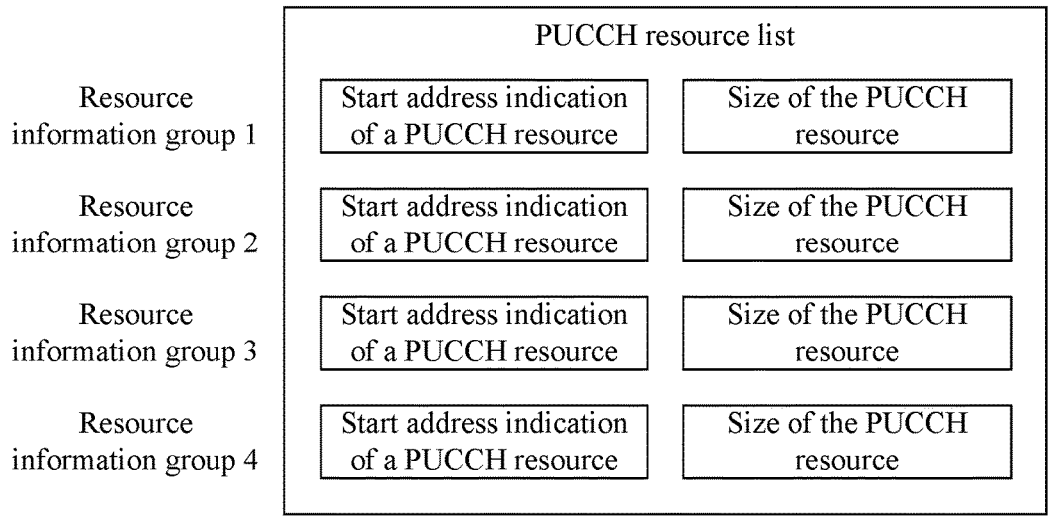
FIG. 11 is a schematic diagram of a fourth PUCCH resource list configured for UE by using RRC configuration signaling.

FIG. 11 is a schematic diagram of a fourth PUCCH resource list configured for UE by using RRC configuration signaling. Each resource information group in the resource list includes start address indication information and size indication information of one PUCCH resource. The RRC configuration signaling may be written in the following form. Apparently, the following signaling content is merely used as an example for describing the present disclosure, instead of a limitation to the present disclosure.

For example, the PUCCH resource list may be configured for the UE by using the following RRC configuration signaling:

```
PUCCH-ConfigDedicated-v13x0::=SEQUENCE{
  pucch-Format-r13 SEQUENCE{
    pucch-Format-AN-List-r13 SEQUENCE(SIZE(1..4)) OF
    PUCCHResourceInfo
  PUCCHResourceInfo::=SEQUENCE{
    ResourceStart    INTEGER(0..549),
    ResourceLen      INTEGER(0..5)
    }
  }
}
```

As shown in FIG. 11, the PUCCH resource list configured for the UE by using the RRC configuration signaling includes four resource information groups. Each resource information group includes start indication information (ResourceStart INTEGER(0 . . . 549)) of one PUCCH resource and size information (ResourceLen INTEGER(0 . . . 5)) of the PUCCH resource. Therefore, PUCCH formats of the four resource information groups further need to be dynamically indicated. That is, each resource information group in the PUCCH resource list configured for the UE by using the RRC configuration signaling includes start address indication information and size indication information of one PUCCH resource.

Further, after determining size information and format information of a PUCCH resource required by the UE, a base station may select, from the PUCCH resource list, a fourth resource information group whose size indication information is the same as the size information of the PUCCH resource required by the UE, and then send an RI corresponding to the fourth resource information group to the UE by using second indication information, and the UE obtains, according to indication of the second indication information, the PUCCH resource corresponding to the fourth resource information group. In addition, the base station further sends, to the UE by using the second indication information, a format index FI of the PUCCH resource corresponding to the format information of the PUCCH resource required by the UE, so as to indicate, to the UE, a PUCCH format of the PUCCH resource corresponding to the fourth resource information group.

Likewise, it should be noted that an ARI information sending method in a related technology may be used to send the second indication information to the UE. For example, a TPC field in DCI in LTE may be used to send the second indication information. In the case shown in FIG. 11, both the RI corresponding to the fourth resource information group and the FI corresponding to the fourth resource information group need to be indicated to the UE by using the second indication information.

In a preferred implementation, two groups of TPC fields may be used to send the second indication information. One group of TPC fields are used to send the RI corresponding to the fourth resource information group, and for a TPC request PUCCH field value, refer to the meaning of the first group of TPC field values shown in Table 2. The other group of TPC fields are used to send the FI indicating, to the UE, the PUCCH resource corresponding to the fourth resource information group, and for a TPC request PUCCH field value, refer to the meaning of the second group of TPC field values shown in Table 3.

In another optional implementation, the base station may alternatively send, by using an extended TPC field, the RI corresponding to the fourth resource information group and the FI indicating, to the UE, the format of the PUCCH resource corresponding to the fourth resource information group. For example, at least 1 bit may be added to the existing TPC field to obtain the extended TPC field, original 2 bits are used to send the RI corresponding to the fourth resource information group, and the newly added bit is used to send the FI indicating, to the UE, the format of the PUCCH resource corresponding to the fourth resource information group. For a specific extended TPC request PUCCH field value, refer to a meaning of a third-type extended TPC field value shown in Table 7. It may be learned, according to a meaning, shown in Table 7, of a TPC field value when a third-type extended TPC field includes 3 bits, that newly added 1 bit may be used to indicate two different formats of PUCCH resources. Apparently, a meaning of a TPC field value when the extended TPC field includes 4 bits may be further obtained according to the meaning, shown in Table 6, of the TPC field value when the second-type extended TPC field includes 3 bits. That is, newly added 2 bits may be used to indicate four different sizes of PUCCH resources.

TABLE 7

Meaning of a third-type extended TPC field value

| TPC field value | Corresponding indication information |
|---|---|
| '000' | Resource information group 1, a PUCCH format 1 |
| '001' | Resource information group 2, a PUCCH format 1 |
| '010' | Resource information group 3, a PUCCH format 1 |
| '011' | Resource information group 4, a PUCCH format 1 |
| '100' | Resource information group 1, a PUCCH format 2 |
| '101' | Resource information group 2, a PUCCH format 2 |
| '110' | Resource information group 3, a PUCCH format 2 |
| '111' | Resource information group 4, a PUCCH format 2 |

Figure 12:
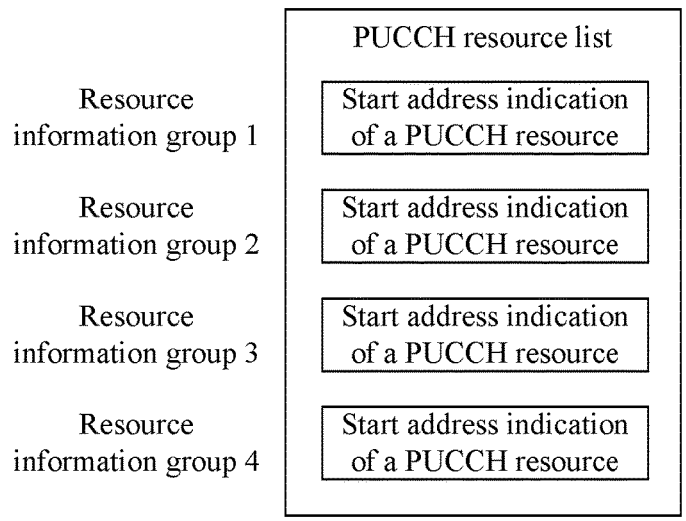
FIG. 12 is a schematic diagram of a fifth PUCCH resource list configured for UE by using RRC configuration signaling.

FIG. 12 is a schematic diagram of a fifth PUCCH resource list configured for UE by using RRC configuration signaling. Each resource information group in the resource list includes start address indication information of one PUCCH resource. For example, the PUCCH resource list may be configured for the UE by using the following RRC configuration signaling:

```
PUCCH-ConfigDedicated-v13x0::=SEQUENCE{
pucch-Format-r13    SEQUENCE{
PUCCH-AN-List-r13   SEQUENCE (SIZE (1..4)) OF INTEGER (0..549)
        }
    }
```

Further, a base station needs to send an RI corresponding to a fifth resource information group to the UE by using second indication information, and the UE obtains, according to indication of the second indication information, a PUCCH resource corresponding to the fifth resource information group. In addition, the base station further needs to send, to the UE by using the second indication information, an FI of a PUCCH resource corresponding to format information of a PUCCH resource required by the UE, so as to indicate, to the UE, a format of the PUCCH resource corresponding to the fifth resource information group. The base station further needs to send, to the UE by using the second indication information, an LI of the PUCCH resource corresponding to size information of the PUCCH resource required by the UE, so as to indicate, to the UE, a size of the PUCCH resource corresponding to the fifth resource information group.

Likewise, it should be noted that an ARI information sending method in a related technology may be used to send the second indication information to the UE. For example, a TPC field in DCI in LTE may be used to send the second indication information. In the case shown in FIG. 11, both the RI corresponding to the fifth resource information group and the FI and the LI that correspond to the fifth resource information group need to be indicated to the UE by using the second indication information.

In a preferred implementation, three groups of TPC fields may be used to send the second indication information. A first group of TPC fields are used to send the RI corresponding to the fifth resource information group, and for a TPC request PUCCH field value, refer to the meaning of the first group of TPC field values shown in Table 2. A second group of TPC fields are used to send the FI indicating, to the UE, the format of the PUCCH resource corresponding to the fifth resource information group, and for a TPC request PUCCH field value, refer to the meaning of the second group of TPC field values shown in Table 3. A third group of TPC fields are used to send the LI indicating, to the UE, the size of the PUCCH resource corresponding to the fifth resource information group, and for a TPC request PUCCH field value, refer to the meaning of the third group of TPC field values shown in Table 5.

In another optional implementation, the base station may alternatively send, by using an extended TPC field, the RI corresponding to the fifth resource information group, the FI indicating, to the UE, the format of the PUCCH resource corresponding to the fifth resource information group, and the LI indicating, to the UE, the size of the PUCCH resource corresponding to the fifth resource information group. For example, at least 2 bits may be added to the existing TPC field to obtain the extended TPC field, original 2 bits are used to send the RI corresponding to the fifth resource information group, and the newly added bits are used to send the FI and the LI indicating, to the UE, the format and the size of the PUCCH resource corresponding to the fifth resource information group.

To add as few bits as possible to the TPC field, in a preferred implementation, the resource list configured for the UE by using the RRC configuration signaling may alternatively include only two resource information groups. Apparently, this is at the cost of resource selection flexibility. In this way, two groups of TPC fields can be used to send the second indication information. One group of TPC fields are used to send an RI and an FI corresponding to a sixth resource information group; and the other group of TPC fields are used to send an LI indicating, to the UE, a PUCCH resource corresponding to the sixth resource information group.

Likewise, it may be understood that when the resource list configured for the UE by using the RRC configuration signaling includes only two resource information groups, alternatively, only 1 bit may be added to the existing TPC field to obtain an extended TPC field, original 2 bits are used to send an RI corresponding to a second resource information group and the FI indicating, to the UE, a format of the PUCCH resource corresponding to the sixth resource information group, and the newly added bit is used to send the LI indicating, to the UE, a size of the PUCCH resource corresponding to the sixth resource information group.

In another embodiment of the present disclosure, how to determine two or three groups of TPC fields is further described by using an example.

As shown in FIG. 6A and FIG. 6B, in an LTE-A system, ARI information sending mechanisms in an FDD mode and in a TDD mode are different. The following separately uses FIG. 13A and FIG. 13B as examples to describe how to group TPC fields.

Figure 13A:
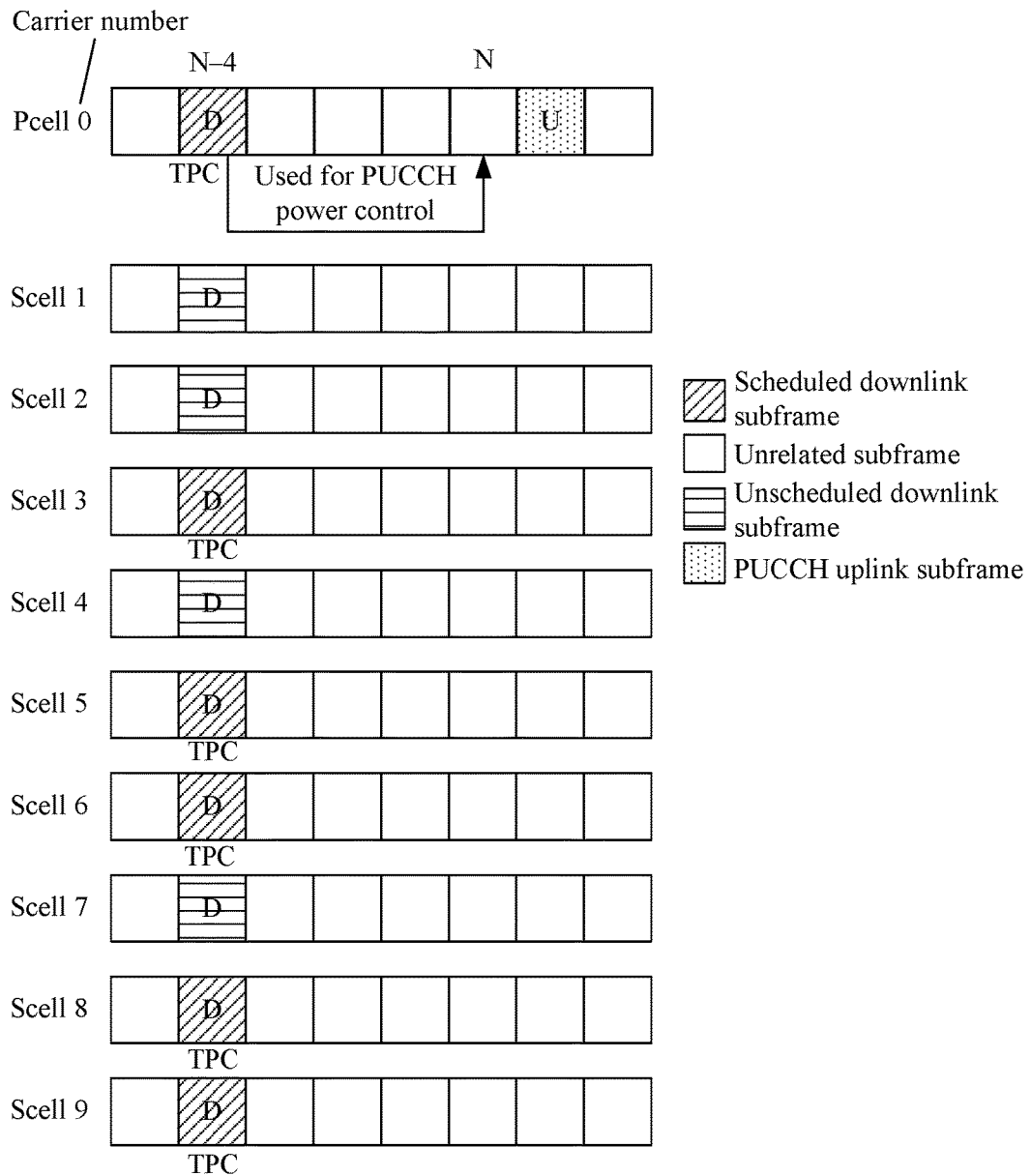
FIG. 13A is a schematic diagram of carrier scheduling in an FDD mode.

FIG. 13A is a schematic diagram of carrier scheduling in an FDD mode. As shown in FIG. 13A, for example, a scheduled carrier set is {0,3,5,6,8,9}, and a carrier 0 is a PCC. In the FDD mode in an LTE-A system, all TPC request PUCCH fields in DCI received on a PCC are used for PUCCH power control. In this case, carriers that can be used to send ARI information are five SCCs, that is, {3,5,6,8,9}. The five scheduled carriers are grouped into two groups.

In an optional implementation, a sequential grouping manner may be used to determine two groups of TPC fields. Specifically, TPC fields on different scheduled carriers may be grouped into two groups.

For example, a quantity of carriers corresponding to each of the two groups of TPC fields may be determined according to the scheduled carrier(s). For example, a first group may correspond to three carriers, and a second group may correspond to two carriers; or a first group may correspond to one carrier, and a second group may correspond to four carriers. Then the scheduled carriers are sequentially grouped into two groups according to an arrangement order of identification numbers of the scheduled carriers and according to the quantity of carriers corresponding to each group of TPC fields, and two corresponding groups of carriers are G1={3,5,6} and G2={8,9}, or G1={3} and G2={5,6,8,9}. The carriers are usually grouped as evenly as possible. For example, a quantity of carriers in the first group is equal to [N/2], and a quantity of carriers in the second group is equal to N−[N/2]. N represents a total quantity of carriers participating in the grouping, and ⌈ ⌉ represents round up calculation. After the carriers are grouped, TPC fields on each of the two groups of scheduled carriers are determined as one group of TPC fields.

In another optional implementation, a parity grouping manner may alternatively be used to determine two groups of TPC fields. Specifically, TPC fields on scheduled carrier(s) whose identification numbers are odd in the scheduled carrier(s) may be determined as one group of TPC fields, and TPC fields on scheduled carrier(s) whose identification numbers are even in the scheduled carriers may be determined as the other group of TPC fields. Correspondingly, TPC fields on G1={3,5,9} are determined as one group of TPC fields, and TPC fields on G2={6,8} are determined as the other group of TPC fields.

It should be noted that the parity grouping manner can be used to determine the two groups of TPC fields only when SCCs with odd and even identification numbers exist in scheduled SCCs. Otherwise, only the sequential grouping manner can be used to determine the two groups of TPC fields.

Figure 13B:
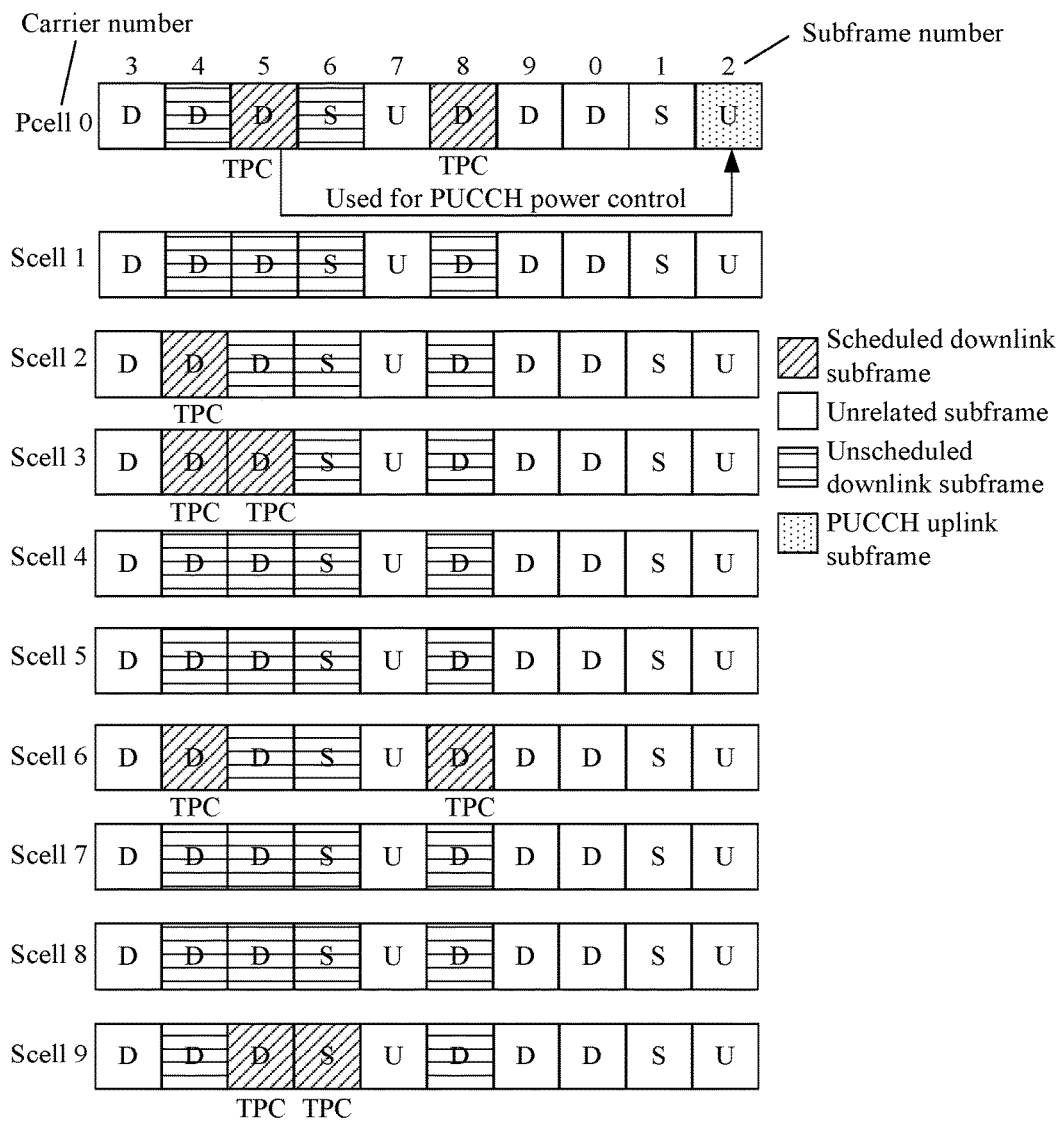
FIG. 13B is a schematic diagram of carrier scheduling in a TDD mode.

FIG. 13B is a schematic diagram of eCA scheduling in a TDD mode. As shown in FIG. 13B, for example, a scheduled carrier set is {0,2,3,6,9}, and a carrier 0 is a PCC. In the TDD mode in an LTE-A system, a TPC request PUCCH field in downlink DCI whose DAI is greater than 1 on a PCC and all TPC request PUCCH fields in downlink DCI received on all SCCs may be used to send ARI information. In this case, five carriers, that is, {0,2,3,6,9}, can be used to send the ARI information. The five scheduled carriers are grouped into two groups.

Likewise, a sequential grouping manner may be used to determine the two groups of scheduled carriers. For example, TPC fields on G1={0 (subframe 8), 2 (subframe 4), 3 (subframe 4, subframe 5)} are determined as one group of TPC fields, and TPC fields on G2={6 (subframe 4, subframe 8), 9 (subframe 5, subframe 6)} are determined as the other group of TPC fields.

Alternatively, a parity grouping manner may be used to determine two groups of TPC fields. For example, TPC fields on G1={0 (subframe 8), 2 (subframe 4), 6 (subframe 4, subframe 8)} are determined as one group of TPC fields, and TPC fields on G2={3 (subframe 4, subframe 5), 9 (subframe 5, subframe 6)} are determined as the other group of TPC fields.

Likewise, it should be noted that because an identification number of the PCC is even, the parity grouping manner can be used to determine the two groups of TPC fields only when an SCC with an odd identification number exists in scheduled SCCs.

Further, for a specific manner of determining three groups of TPC fields, refer to the sequential grouping manner in the foregoing embodiment. Principles thereof are the same. Therefore, details are not described herein again. It should be noted that there are a plurality of TPC grouping manners, and the present disclosure imposes no limitation on a specific grouping manner.

According to the resource allocation manners in carrier aggregation provided in the foregoing embodiments of the present disclosure, the base station configures a plurality of PUCCH resources for the UE by using the RRC configuration signaling, and then completes, according to an actual requirement of the UE by using indication of the ARI, selection of a PUCCH resource and dynamic and flexible determining of a PUCCH resource size and a PUCCH format. This can not only satisfy a requirement of an eCA scenario in which UCI fed back by the UE by using the PUCCH may occupy resources of more than one PRB pair, but can also improve utilization of the PUCCH resource. In addition, in the embodiments of the present disclosure, different PUCCH formats may be used for different subframes, and a plurality of variable candidates for a new PUCCH format can be supported, so that system performance is optimized.

Figure 14:
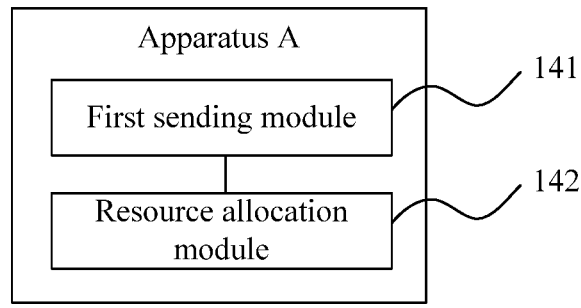
FIG. 14 is a schematic diagram of an uplink control information transmission apparatus in carrier aggregation according to an embodiment of the present disclosure.

FIG. 14 is a schematic diagram of an uplink control information transmission apparatus in carrier aggregation according to an embodiment of the present disclosure. The apparatus A may be disposed in a base station, and may be used to implement the uplink control information transmission method in carrier aggregation provided in the embodiment shown in FIG. 5 of the present disclosure. Details are not described herein again. As shown in FIG. 14, the uplink control information transmission apparatus A in carrier aggregation provided in this embodiment includes a first sending module 141 and a resource allocation module 142.

The first sending module 141 may be configured to send first indication information to a user equipment (UE), where the first indication information is used to instruct the UE to dynamically determine uplink control information UCI according to the first indication information. The resource allocation module 142 may be configured to allocate a PUCCH resource to the UE, where the PUCCH resource is used to transmit the UCI.

In this embodiment, the first indication information may be first-type indication information or second-type indication information. When the first indication information is the first-type indication information, the UE determines UCI according to the first-type indication information when the base station generates DAI information according to a quantity of scheduled carrier(s). When the first indication information is the second-type indication information, the UE determines UCI according to the second-type indication information when the base station generates the DAI information according to a quantity of scheduled codewords.

In an optional implementation, the first sending module may be configured to send first configuration information to the UE. The first configuration information includes the first indication information.

In another optional implementation, the first sending module may be further configured to send downlink control information DCI to the UE. The DCI includes the first indication information.

In still another optional implementation, the first sending module may be further configured to: send DCI encoded in a first manner to the UE, where the first manner corresponds to the first-type indication information, and in the first manner, a scrambling code is not added to a cyclic redundancy check CRC that is generated during DCI encoding; or send DCI encoded in a second manner to the UE, where the second manner corresponds to the second-type indication information, and in the second manner, a scrambling code is added to a CRC code that is generated during DCI encoding.

The uplink control information transmission apparatus in carrier aggregation provided in this embodiment may be disposed in the base station, and may be used to implement the uplink control information transmission method in carrier aggregation provided in the embodiment shown in FIG. 5 of the present disclosure. Implementation principles and technical effects thereof are similar. Details are not described herein again.

Figure 15:
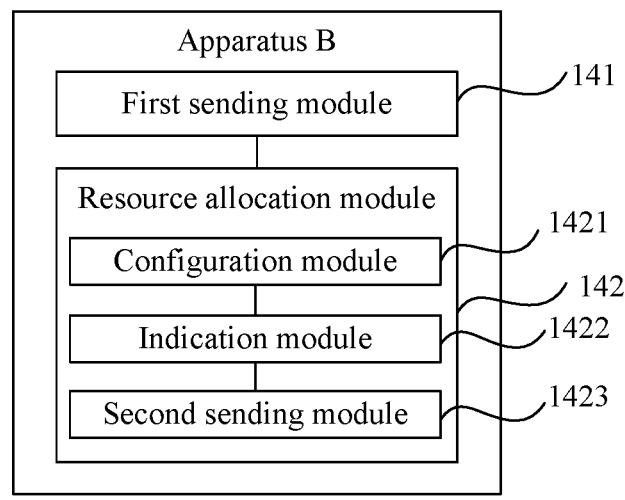
FIG. 15 is a schematic diagram of another uplink control information transmission apparatus in carrier aggregation according to an embodiment of the present disclosure.

FIG. 15 is a schematic diagram of another uplink control information transmission apparatus in carrier aggregation according to an embodiment of the present disclosure. The apparatus B may be disposed in a base station, and may be used to implement the uplink control information transmission method in carrier aggregation provided in the embodiment shown in FIG. 5 and the PUCCH resource allocation method in carrier aggregation provided in the embodiment shown in FIG. 7 of the present disclosure. Details are not described herein again. As shown in FIG. 15, based on the embodiment shown in FIG. 14, in this embodiment, the resource allocation module 142 may further include a configuration module 1421, an indication module 1422, and a second sending module 1423.

The configuration module 1421 may be configured to generate second configuration information, where the second configuration information is used to configure a resource list for the UE, and the resource list includes a plurality of resource information groups. The indication module 1422 may be configured to generate second indication information, where the second indication information is used to indicate, to the UE, a PUCCH resource corresponding to one resource information group in the resource list. The second sending module 1423 may be configured to send the second configuration information and the second indication information to the UE.

In a first possible implementation, if the plurality of resource information groups configured by the configuration module 1421 for the UE are arranged according to different PUCCH formats, each PUCCH format corresponds to at least one resource information group, and each resource information group includes start address indication information and size indication information of one PUCCH resource, the second indication information generated by the indication module 1422 may include a resource index RI, and the RI is used to indicate, to the UE, a first resource information group corresponding to the RI.

Further, the second sending module 1423 may be configured to send, by using a transmit power control TPC field, the second indication information, that is, the RI corresponding to the first resource information group.

In a second possible implementation, if the plurality of resource information groups configured by the configuration module 1421 for the UE are arranged according to different PUCCH formats, each PUCCH format corresponds to at least one resource information group, and each resource information group includes start address indication information of one PUCCH resource, the second indication information generated by the indication module 1422 may include a resource index RI and a length index LI. The RI is used to indicate, to the UE, a second resource information group corresponding to the RI, and the LI is used to indicate, to the UE, a size of a PUCCH resource corresponding to the second resource information group.

Further, the second sending module 1423 may be configured to: determine two groups of TPC fields according to scheduled carriers, where one group is used to send the RI corresponding to the second resource information group, and the other group is used to send the LI indicating, to the UE, the size of the PUCCH resource corresponding to the second resource information group; or send the RI and the LI by using an extended TPC field, where the extended TPC field includes more than 2 bits.

In a third possible implementation, if each resource information group in the resource list configured by the configuration module 1421 for the UE includes start address indication information and size indication information of one PUCCH resource, the second indication information generated by the indication module 1422 may include a resource index RI and a format index FI. The RI is used to indicate, to the UE, a third resource information group corresponding to the RI, and the FI is used to indicate, to the UE, a format of a PUCCH resource corresponding to the third resource information group.

Further, the second sending module 1423 may be configured to: determine two groups of TPC fields according to scheduled carriers, where one group is used to send the RI corresponding to the third resource information group, and the other group is used to send the FI indicating, to the UE, the format of the PUCCH resource corresponding to the third resource information group; or send the RI and the FI by using an extended TPC field, where the extended TPC field includes more than 2 bits.

In a fourth possible implementation, if each resource information group in the resource list configured by the configuration module 1421 for the UE includes start address indication information of one PUCCH resource, the second indication information generated by the indication module 1422 may include a resource index RI, a format index FI, and a length index LI. The RI is used to indicate, to the UE, a fourth resource information group corresponding to the RI, the FI is used to indicate, to the UE, a format of a PUCCH resource corresponding to the fourth resource information group, and the LI is used to indicate, to the UE, a size of the PUCCH resource corresponding to the fourth resource information group.

Further, the second sending module 1423 may be configured to: determine three groups of TPC fields according to scheduled carriers, where a first group is used to send the RI corresponding to the fourth resource information group, a second group is used to send the FI indicating, to the UE, the format of the PUCCH resource corresponding to the fourth resource information group, and a third group is used to send the LI indicating, to the UE, the size of the PUCCH resource corresponding to the fourth resource information group; or send the RI, the FI, and the LI by using an extended TPC field, where the extended TPC field includes more than 2 bits.

For example, in the fourth possible implementation, if the resource list configured by the configuration module 1421 for the UE includes two resource information groups, the second sending module 1423 may be configured to determine two groups of TPC fields according to scheduled carriers, where one group is used to send the RI corresponding to the fourth resource information group and the FI indicating, to the UE, the format of the PUCCH resource corresponding to the fourth resource information group, and the other group is used to send the LI indicating, to the UE, the size of the PUCCH resource corresponding to the fourth resource information group.

In this embodiment, if the second sending module 1423 sends corresponding possible combinations of the RI, the FI, and the LI by using the two groups of TPC fields, in an optional implementation, the second sending module 1423 may be configured to: group the scheduled carriers into two groups according to an order of identification numbers of the scheduled carriers, and then determine TPC fields on each of the two groups of scheduled carriers as one group of TPC fields; and in another optional implementation, if the scheduled carriers include a scheduled carrier whose identification number is odd and a scheduled carrier whose identification number is even, the second sending module 1423 may be further configured to: determine TPC fields on scheduled carriers whose identification numbers are odd in the scheduled carriers as one group of TPC fields, and determine TPC fields on scheduled carriers whose identification numbers are even in the scheduled carriers as the other group of TPC fields.

The uplink control information transmission apparatus in carrier aggregation provided in this embodiment may be disposed in the base station, and may be used to implement the uplink control information transmission method in carrier aggregation provided in the embodiment shown in FIG. 5 and the PUCCH resource allocation method in carrier aggregation provided in the embodiment shown in FIG. 7 of the present disclosure. Implementation principles and technical effects thereof are similar. Details are not described herein again.

Figure 16:
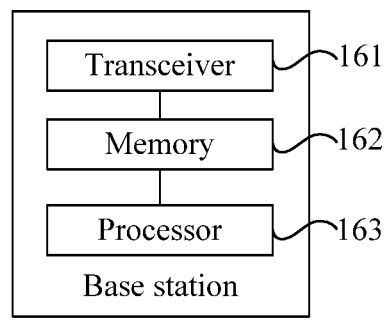
FIG. 16 is a schematic diagram of a base station according to an embodiment of the present disclosure.

FIG. 16 is a schematic diagram of a base station according to an embodiment of the present disclosure. The base station may be used to implement the uplink control information transmission method in carrier aggregation provided in the embodiment shown in FIG. 5 and the PUCCH resource allocation method in carrier aggregation provided in the embodiment shown in FIG. 7 of the present disclosure. Details are not described herein again. As shown in FIG. 16, the base station provided in this embodiment includes a transceiver 161, a memory 162, and a processor 163. The processor 163 is coupled to the memory 162.

Specifically, the transceiver 161 may be configured to send first indication information to a user equipment (UE), where the first indication information is used to instruct the UE to dynamically determine uplink control information UCI according to the first indication information. The processor 163 may be configured to allocate a PUCCH resource to the UE, where the PUCCH resource is used to transmit the UCI.

In this embodiment, the first indication information may be first-type indication information or second-type indication information. When the first indication information is the first-type indication information, the UE determines UCI according to the first-type indication information when the base station generates DAI information according to a quantity of scheduled carrier(s). When the first indication information is the second-type indication information, the UE determines UCI according to the second-type indication information when the base station generates the DAI information according to a quantity of scheduled codewords.

In actual application, the transceiver 161 may be configured to send first configuration information to the UE, where the first configuration information includes the first indication information. The transceiver 161 may be further configured to send downlink control information DCI to the UE, where the DCI includes the first indication information. Alternatively, the transceiver 161 may be configured to: send DCI encoded in a first manner to the UE, where the first manner corresponds to the first-type indication information, and in the first manner, a scrambling code is not added to a cyclic redundancy check CRC code that is generated during DCI encoding; or send DCI encoded in a second manner to the UE, where the second manner corresponds to the second-type indication information, and in the second manner, a scrambling code is added to a CRC code that is generated during DCI encoding.

In actual application, the processor 162 may be configured to generate second configuration information and second indication information. The second configuration information is used to configure a resource list for the UE, and the resource list includes a plurality of resource information groups. The second indication information is used to indicate, to the UE, a PUCCH resource corresponding to one resource information group in the resource list. Further, the transceiver 161 may be further configured to send the second configuration information and the second indication information to the UE.

In a first possible implementation, if the plurality of resource information groups are arranged according to different PUCCH formats, each PUCCH format corresponds to at least one resource information group, and each resource information group includes start address indication information and size indication information of one PUCCH resource, the second indication information includes a resource index RI, and the RI is used to indicate, to the UE, a first resource information group corresponding to the RI.

Further, the transceiver 161 may be configured to send, by using a transmit power control TPC field, the second indication information, that is, the RI corresponding to the first resource information group.

In a second possible implementation, if the plurality of resource information groups are arranged according to different PUCCH formats, each PUCCH format corresponds to at least one resource information group, and each resource information group includes start address indication information of one PUCCH resource, the second indication information includes an RI, and the RI is used to indicate, to the UE, a second resource information group corresponding to the RI. In addition, the second indication information further includes a length index LI, and the LI is used to indicate, to the UE, a size of a PUCCH resource corresponding to the second resource information group.

Further, the transceiver 161 may be configured to: determine two groups of TPC fields according to scheduled carrier(s), where one group is used to send the RI corresponding to the second resource information group, and the other group is used to send the LI indicating, to the UE, the size of the PUCCH resource corresponding to the second resource information group; or send the RI and the LI by using an extended TPC field, where the extended TPC field includes more than 2 bits.

In a third possible implementation, if each resource information group in the resource list includes start address indication information and size indication information of one PUCCH resource, the second indication information includes an RI, and the RI is used to indicate, to the UE, a third resource information group corresponding to the RI. In addition, the second indication information further includes a format index FI, and the FI is used to indicate, to the UE, a PUCCH format of a PUCCH resource corresponding to the third resource information group.

Further, the transceiver 161 may be configured to: determine two groups of TPC fields according to scheduled carrier(s), where one group is used to send the RI corresponding to a second resource information group, and the other group is used to send the FI indicating, to the UE, the format of the PUCCH resource corresponding to the second resource information group; or send the RI and the FI by using an extended TPC field, where the extended TPC field includes more than 2 bits.

In a fourth possible implementation, if each resource information group in the resource list includes start address indication information of one PUCCH resource, the second indication information includes an RI, and the RI is used to indicate, to the UE, a fourth resource information group corresponding to the RI. In addition, the second indication information further includes an FI and an LI, the FI is used to indicate, to the UE, a PUCCH format of a PUCCH resource corresponding to the fourth resource information group, and the LI is used to indicate, to the UE, a size of the PUCCH resource corresponding to the fourth resource information group.

Further, the transceiver 161 may be configured to: determine three groups of TPC fields according to scheduled carrier(s), where a first group is used to send the RI corresponding to the fourth resource information group, a second group is used to send the FI indicating, to the UE, the format of the PUCCH resource corresponding to the fourth resource information group, and a third group is used to send the LI indicating, to the UE, the size of the PUCCH resource corresponding to the fourth resource information group; or send the RI, the FI, and the LI by using an extended TPC field, where the extended TPC field includes more than 2 bits.

For example, in the fourth possible implementation, if the resource list includes two resource information groups (each resource information group includes start address indication information of one PUCCH resource), the transceiver 161 may be configured to determine two groups of TPC fields according to scheduled carrier(s), where one group is used to send the RI corresponding to the fourth resource information group and the FI indicating, to the UE, the format of the PUCCH resource corresponding to the fourth resource information group, and the other group is used to send the LI indicating, to the UE, the size of the PUCCH resource corresponding to the fourth resource information group.

In this embodiment, if the transceiver 161 sends corresponding possible combinations of the RI, the FI, and the LI by using the two groups of TPC fields, in an optional implementation, the transceiver 161 may be configured to: group the scheduled carriers into two groups according to an order of identification numbers of the scheduled carriers, and then determine TPC fields on each of the two groups of scheduled carriers as one group of TPC fields; and in another optional implementation, if the scheduled carriers include a scheduled carrier whose identification number is odd and a scheduled carrier whose identification number is even, the transceiver 161 may be further configured to: determine TPC fields on scheduled carriers whose identification numbers are odd in the scheduled carriers as one group of TPC fields, and determine TPC fields on scheduled carriers whose identification numbers are even in the scheduled carriers as the other group of TPC fields.

The base station provided in this embodiment may be used to implement the uplink control information transmission method in carrier aggregation provided in the embodiment shown in FIG. 5 and the PUCCH resource allocation method in carrier aggregation provided in the embodiment shown in FIG. 7 of the present disclosure. Implementation principles and technical effects are similar. Details are not described herein again.

An embodiment of the present disclosure further provides a plurality of communications systems, including the UE and the base station that includes the uplink control information transmission apparatus in carrier aggregation provided in the embodiment shown in FIG. 14 or FIG. 15, or including the UE and the base station provided in the embodiment shown in FIG. 16.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method for sending information in a communications system, comprising:
   receiving, by a user equipment (HE), a radio resource control (RRC) configuration signaling from a base station carrying indication information instructing the HE to perform spatial bundling on hybrid automatic repeat request (HARQ) acknowledgement/negative acknowledgement (ACK/NACK) information, wherein the spatial bundling is an AND logical operation on the HARQ ACK/NACK information, and the HARQ ACK/NACK information comprises two bits corresponding to two codewords of a carrier;
   performing, by the UE, according to the indication information, the spatial bundling on the HARQ ACK/NACK information by performing the AND logical operation on the two bits of the HARQ ACK/NACK information to determine bundled HARQ information, wherein the bundled HARQ information comprises 1-hit ACK/NACK information; and
   sending, by the HE, the bundled HARQ information on a physical uplink control channel (PUCCH) resource.

2. The method of claim 1, further comprising:
   receiving a high layer signaling indicating multiple PUCCH resources; and
   receiving downlink control information indicating the PUCCH resource from the multiple PUCCH resources.

3. The method of claim 2, wherein, for each given PUCCH resource of the multiple PUCCH resources, the given PUCCH resource includes a start address and a size of the given PUCCH resource.

4. The method of claim 2, wherein each PUCCH resource of the multiple PUCCH resources corresponds to a PUCCH format.

5. The method of claim 2, wherein the multiple PUCCH resources comprise at least two PUCCH resources corresponding to one PUCCH format.

6. The method of claim 1, further comprising:
   receiving downlink control information comprising a resource indicator indicating the PUCCH resource.

7. The method of claim 1, further comprising:
   receiving downlink control information comprising a transmit power control (TPC) field indicating the PUCCH resource.

8. An apparatus, comprising:
   a memory storing a program; and
   a processor coupled with the memory, wherein the processor is configured to execute the program to cause the apparatus to:
   receive a radio resource control (RRC) configuration signaling from a base station carrying indication information instructing the apparatus to perform spatial bundling on hybrid automatic repeat request (HARQ) acknowledgement/negative acknowledgement (ACK/NACK) information, wherein the spatial bundling is an AND logical operation on the HARQ ACK/NACK information, and the HARQ ACK/NACK information comprises two bits corresponding to two codewords of a carrier;
   perform, according to the indication information, the spatial bundling on the HARQ ACK/NACK information by performing the AND logical operation on the two bits of the HARQ ACK/NACK information to determine bundled HARQ information, wherein the bundled HARQ information comprises 1-bit ACK/NACK information; and send the bundled HARQ information on a physical uplink control channel (PUCCH) resource.

9. The apparatus of claim 8, wherein the processor is further configured to execute the program to cause the apparatus to:

receive a high layer signaling indicating multiple PUCCH resources; and receive downlink control information indicating the PUCCH resource from the multiple PUCCH resources.

10. The apparatus of claim 9, wherein, for each given PUCCH resource of the multiple PUCCH resources, the given PUCCH resource includes a start address and a size of the given PUCCH resource.

11. The apparatus of claim 9, wherein each PUCCH resource of the multiple PUCCH resources corresponds to a PUCCH format.

12. The apparatus of claim 9, wherein the multiple PUCCH resources comprise at least two PUCCH resources corresponding to one PUCCH format.

13. The apparatus of claim 8, wherein the processor is further configured to execute the program to cause the apparatus to:

receive downlink control information comprising a resource indicator indicating the PUCCH resource.

14. The apparatus of claim 8, wherein the processor is further configured to execute the program to cause the apparatus to:

receive downlink control information comprising a transmit power control (TPC) field indicating the PUCCH resource.

15. A non-transitory computer readable medium comprising instructions stored therein that, when executed by a processor, cause the processor to:

receive a radio resource control (RRC) configuration signaling from a base station carrying indication information instructing the processor to perform spatial bundling on hybrid automatic repeat request (HARQ) acknowledgement/negative acknowledgement (ACK/NACK) information, wherein the spatial bundling is an AND logical operation on the HARQ ACK/NACK information, and the HARQ ACK/NACK information comprises two bits corresponding to two codewords of a carrier;

perform, according to the indication information, the spatial bundling on the HARQ ACK/NACK information b performing the AND logical operation on the two bits of the HARQ ACK/NACK information to determine bundled HARQ information, wherein the bundled HARQ information comprises 1-bit ACK/NACK information; and send the bundled HARQ information on a physical uplink control channel (MATH) resource.

16. The non-transitory computer readable medium of claim 15, further comprising instructions for causing the processor to:

receive a high layer signaling indicating multiple PUCCH resources; and receive downlink control information indicating the PUCCH resource from the multiple PUCCH resources.

17. The non-transitory computer readable medium of claim 16, wherein, for each given PUCCH resource of the multiple PUCCH resources, the given PUCCH resource includes a start address and a size of the given PUCCH resource.

18. The non-transitory computer readable medium of claim 16, wherein each PUCCH resource of the multiple PUCCH resources corresponds to a PUCCH format.

19. The non-transitory computer readable medium of claim 16, wherein the multiple PUCCH resources comprise at least two PUCCH resources corresponding to one PUCCH format.

20. The non-transitory computer readable medium of claim 15, further comprising instructions for causing the processor to:

receive downlink control information comprising a resource indicator indicating the PUCCH resource.

* * * * *

UNITED STATES PATENT AND TRADEMARK OFFICE
CERTIFICATE OF CORRECTION

PATENT NO. : 10,433,290 B2  
APPLICATION NO. : 15/927787  
DATED : October 1, 2019  
INVENTOR(S) : Xiao et al.

Page 1 of 1

It is certified that error appears in the above-identified patent and that said Letters Patent is hereby corrected as shown below:

In the Claims

Claim 1, Column 34, Line 7, "(HE)" should read -- (UE) --.

Claim 1, Column 34, Line 10, "HE" should read -- UE --.

Claim 1, Column 34, Line 23, "1-hit" should read -- 1-bit --.

Claim 1, Column 34, Line 24, "HE" should read -- UE --.

Signed and Sealed this  
Seventeenth Day of March, 2020

Andrei Iancu  
*Director of the United States Patent and Trademark Office*